US009576432B2

(12) United States Patent
Kato et al.

(10) Patent No.: US 9,576,432 B2
(45) Date of Patent: Feb. 21, 2017

(54) GAMING MACHINE AND GAMING METHOD

(71) Applicants: Universal Entertainment Corporation, Tokyo (JP); Aruze Gaming America, Inc., Las Vegas, NV (US)

(72) Inventors: Yoichi Kato, Tokyo (JP); Hiroki Nakamura, Tokyo (JP); Masumi Fujisawa, Tokyo (JP); Kazuo Okada, Tokyo (JP)

(73) Assignees: UNIVERSAL ENTERTAINMENT CORPORATION, Tokyo (JP); ARUZA GAMING AMERICA, INC., Las Vegas, NV (US)

( * ) Notice: Subject to any disclaimer, the term of this patent is extended or adjusted under 35 U.S.C. 154(b) by 818 days.

(21) Appl. No.: 13/624,231

(22) Filed: Sep. 21, 2012

(65) Prior Publication Data

US 2014/0087812 A1 Mar. 27, 2014

(51) Int. Cl.
*A63F 13/00* (2014.01)
*G07F 17/32* (2006.01)

(52) U.S. Cl.
CPC ....... *G07F 17/3267* (2013.01); *G07F 17/3213* (2013.01)

(58) Field of Classification Search
CPC ............................ G07F 17/3213; G07F 17/34
USPC ..................................................... 463/21, 23
See application file for complete search history.

(56) References Cited

U.S. PATENT DOCUMENTS

2008/0058067 A1 3/2008 Okada
2008/0058072 A1 3/2008 Okada
2011/0003630 A1 * 1/2011 Rasmussen et al. ............ 463/20

* cited by examiner

*Primary Examiner* — David L Lewis
*Assistant Examiner* — Robert Mosser
(74) *Attorney, Agent, or Firm* — Lex IP Meister, PLLC

(57) ABSTRACT

A game is executed in a normal round, in a first-type free round, and in a second-type free round. The normal round is executed with a first symbol set including a plurality of symbols. The first-type free round is executed with a second symbol set that includes at least one first symbol in addition to the symbols in the first symbol set. The second-type free round is executed with a third symbol set that includes at least one second symbol in addition to the symbols in the first symbol set, the at least one second symbol being different from the at least one first symbol.

12 Claims, 33 Drawing Sheets

GAMING MACHINE AND GAMING METHOD

BACKGROUND (a) Field

The present invention generally relates to a gaming machine and a gaming method.

(b) Description of the Related Art

A conventional gaming machine includes a display arranged with a plurality of symbols. The gaming machine rearranges the symbols in a unit game, and awards a payout to a player according to the combination of rearranged symbols (for example, United State Patent Application Publication No. 2008/0058067 and United State Patent Application Publication No. 2008/0058072). The player can start another unit game after one unit game ends.

However, in the conventional gaming machine, although the unit games are repeatedly executed, there is continuity of the unit games. Since the conventional gaming machine does not provide the continuity of the unit games, it is difficult to attract a player's interest in a game.

SUMMARY

A gaming machine according to embodiment of the present invention includes: a display device configured to display arrangements of symbols, each arrangement of the symbols selected from a set of symbols; and a controller configured to control the display device, and to execute a game in a normal round, in a first-type free round, or in a second-type free round, thereby determining an arrangement of the symbols to be displayed on the display device, wherein the normal round is executed with a first symbol set including a plurality of symbols, the first-type free round is executed with a second symbol set that includes at least one first symbol in addition to the symbols in the first symbol set, the second-type free round is executed with a third symbol set that includes at least one second symbol in addition to the symbols in the first symbol set, the at least one second symbol being different from the at least one first symbol, a first number of the first-type free rounds are successively executed when a first condition is satisfied in the normal round, and a second number of the second-type free rounds are successively executed after the execution of the first number of the first-type free rounds are finished when a second condition is satisfied in the first-type free rounds.

Each of the at least one first symbol may include a wild symbol that is configured to substitute for other symbols, and each of the at least one second symbol may include a top symbol providing a higher probability of forming a winning combination than other symbols.

A minimum number of the top symbols required to form a winning combination may be smaller than a minimum number of other symbols required to form a winning combination.

Each of the first to third symbol sets may include a plurality of symbol strips including a first symbol strip, each arrangement of the symbols may include a predetermined number of symbols selected from each of the plurality of symbol strips, and a winning combination in an arrangement of the symbols may include either at least two of the top symbols or at least three of the same symbols except for the top symbols successively arranged on a payline starting from a first symbol strip.

Each of the first to third symbol sets may include a plurality of symbol strips including a first symbol strip, each arrangement of the symbols may include a predetermined number of symbols selected from each of the plurality of symbol strips, the at least one first symbol may be disposed on the symbol strips other than the first symbol strip from which a payline starts, and the at least one second symbol may be disposed on the first symbol strip.

The at least one first symbol in the second symbol set may be included in different symbol strips.

The plurality of symbol strips may include first to fifth symbol strips, a number of the at least one first symbols may be four, and a number of the at least one second symbols may be four.

The first symbol set may include a plurality of third symbols, and the first condition may be that an arrangement of the symbols determined in the normal round may include a third number of the third symbols.

The second condition may be that an arrangement of the symbols determined in the first-type free rounds includes the third number of the third symbols.

The first condition may be that each of the first to third symbol strips in an arrangement of the symbols determined in the normal round includes one of the third symbols, and the second condition may be that each of the first to third symbol strips in an arrangement of the symbols determined in the first-type free rounds includes one of the third symbols.

The third symbols may be scatter symbols that are configured to form a scatter win.

The first number may be greater than the second number.

A gaming method according to an embodiment of the present invention includes: executing a normal round of a game with a first symbol set including a plurality of symbols; determining whether a first condition is satisfied in the normal round; and executing free rounds of the game when the first condition is satisfied in the normal round, wherein the executing free rounds includes: adding first symbols into the first symbol set to form a second symbol set when the first condition is satisfied in the normal round; executing a first number of first-type free rounds of the game with the second symbol set; determining whether a second condition is satisfied in the first-type free rounds; and adding second symbols into the first symbol set to form a third symbol set after the executing the first number of first-type free rounds is finished when the second condition is satisfied in the first-type free rounds; and executing a second number of second-type free rounds of the game with the third symbol set.

The first symbols may be wild symbols that are configured to substitute for other symbols, and the second symbols may be top symbols, a minimum number of the top symbols required for forming a winning combination being smaller than a minimum number of the top symbols required for other symbols.

The executing the normal round may include: selecting a first arrangement of symbols from the first symbol set. The executing the first number of first-type free rounds may include: executing a first-type free round to determine a second arrangement of symbols selected from the second symbol set. The executing the second number of second-type free rounds may include: executing a second-type free round to determine a third arrangement of symbols from the third symbol set. Each of the first to third symbol sets may include a plurality of symbol strips including a first symbol strip. Each of the first to third arrangements may include a predetermined number of symbols selected from each of the plurality of symbol strips. The first symbols in the second symbol set may be included in the symbol strips other than the first symbol strip from which a payline starts, and the second symbols in the third symbol set may be included in the first symbol strip.

The executing the normal round may include: selecting a first arrangement of symbols from the first symbol set. The determining whether the first condition is satisfied in the normal mode may include: determining whether the first arrangement of symbols includes a predetermined number of third symbols.

The executing the first number of first-type free rounds and the determining whether the second condition is satisfied in the first-type free rounds include: executing a first-type free round to determine a second arrangement of symbols selected from the second symbol set; determining whether the second arrangement includes the predetermined number of the third symbols; determining whether any of arrangements of symbols determined in previous first-type free rounds includes the predetermined number of the third symbols when the second arrangement includes the predetermined number of the third symbols; and increasing a total number of remaining free rounds by the second number when any of arrangements of symbols determined in the previous first-type free rounds does not include the predetermined number of the third symbols.

The executing the second number of second-type free rounds may include: executing a second-type free round to determine a third arrangement of symbols from the third symbol set.

The third symbols may be scatter symbols that are configured to form a scatter win.

DETAILED DESCRIPTION

Figure 1:
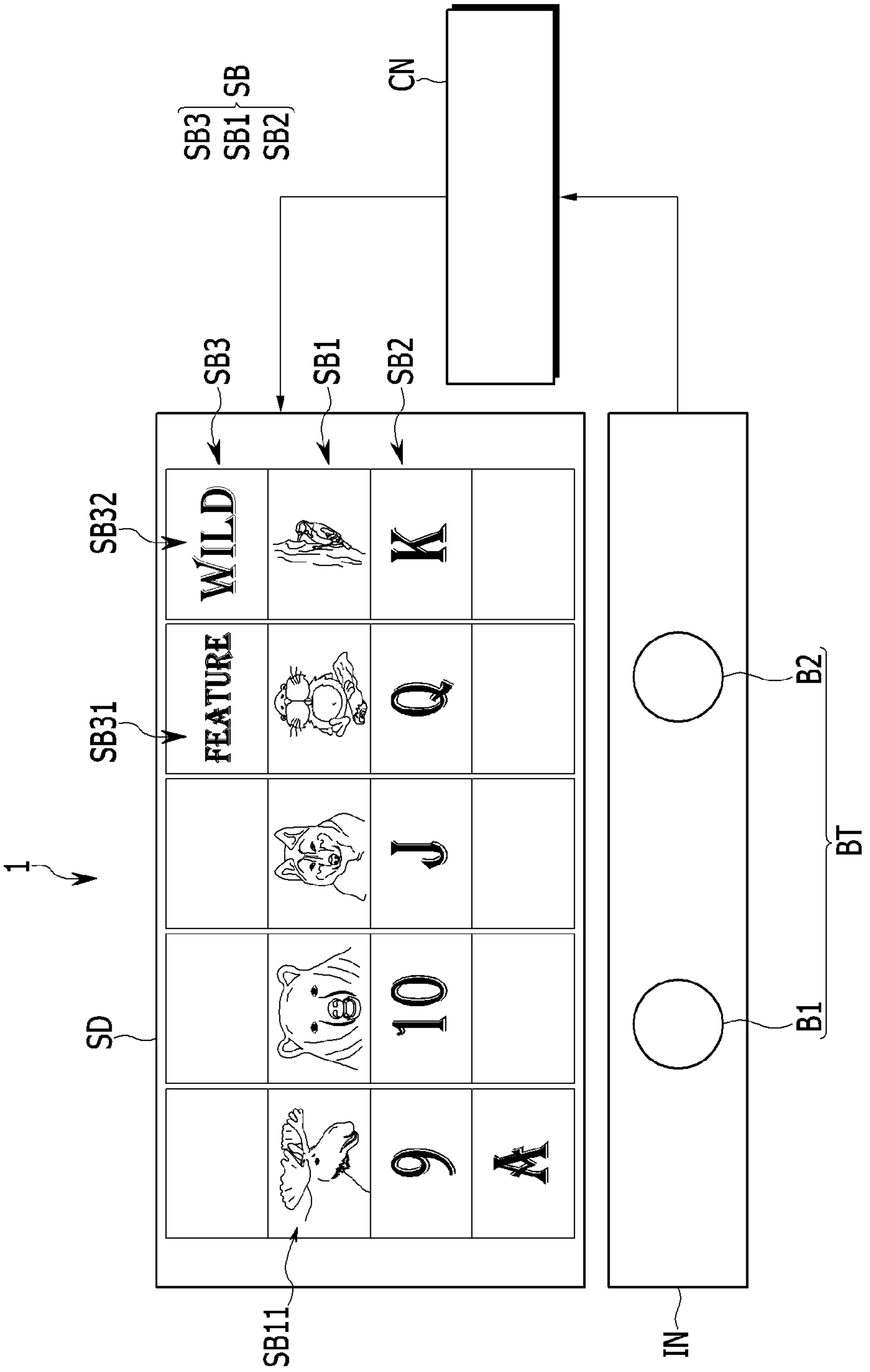
FIG. 1 is a schematic block diagram of a gaming machine according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Outline of Gaming Machine and Gaming Method

A gaming machine according to an embodiment of the present invention is described with reference to FIG. 1 and FIG. 2.

Figure 2:
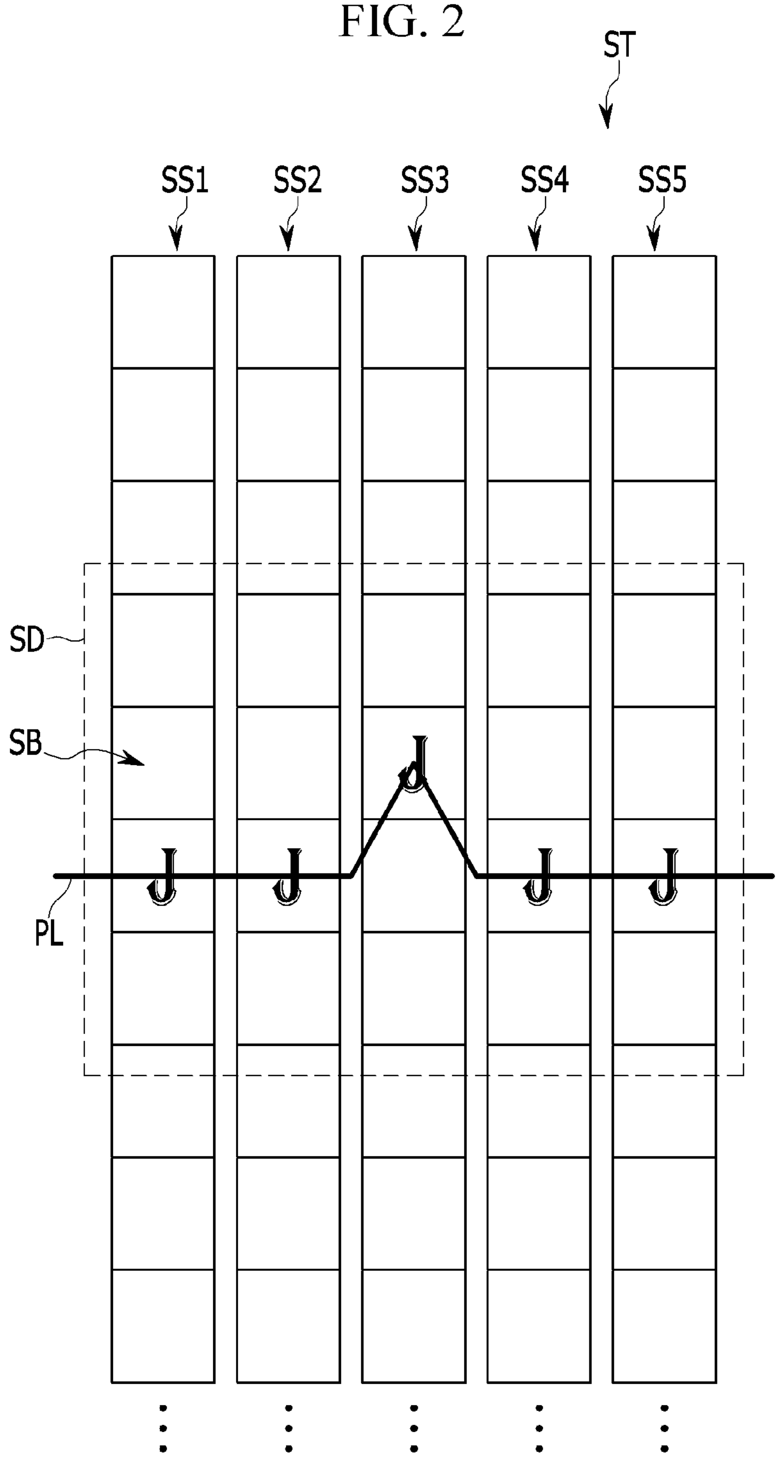
FIG. 2 is a schematic view of a reel unit in a gaming machine according to an embodiment of the present invention.

FIG. 1 is a schematic block diagram of a gaming machine according to an embodiment of the present invention, and FIG. 2 is a schematic view of a reel unit in a gaming machine according to an embodiment of the present invention.

Referring to FIG. 1, a gaming machine 1 according to an embodiment of the present invention includes a symbol display SD, an input unit IN, and a controller CN connected to the symbol display SD and the input unit IN. The gaming machine 1 may execute a game in a normal mode or a free mode.

The symbol display SD displays a set of symbols SB for the game, in a moving state or in a stop state. Referring to FIG. 2, the symbols SB in a symbol set ST may be disposed on a plurality of reels that may be virtual/video reels or actual/mechanical reels, and each reel carries a series of the symbols SB forming a symbol strip SS1-SS5. Each symbol strip SS1-SS5 starts to move, spin, or scroll to perform a rendering movement, and then stops the movement in an execution (or a round) of the game. A predetermined number of consecutive symbols in each symbol strip SS1-SS5 can be displayed on the symbol display SD in the stop state while remaining symbols are not shown on the symbol display SD. The symbols SB shown on the symbol display SD in the stop state form "a symbol arrangement" including rows and columns. According to an embodiment of the present invention, a set of symbols SB includes five symbol strips SS1-SS5, and four symbols selected from each of the five symbol strips SS1-SS5, that is, a total of twenty symbols form a symbol arrangement in a shape of a 4×5 matrix.

FIG. 2 shows an exemplary payline PL that passes through a row in each column of a symbol arrangement. When a group of the symbols SB in the symbol arrangement placed on the payline PL satisfies a predetermined condition, a player may win the game. For example, when two, three, or more symbols SB successively arranged from a first symbol strip SS1 to right along the payline PL are the same, the gaming machine 1 awards a prize to the player. Such a combination of the symbols SB that provides a win is referred to as a "winning combination." Various paylines may be drawn, and two or more of the paylines may be selected by the player to expect more probability of win.

In addition to a win with the payline PL (referred to as a "line win"), there is another type of win referred to as a "scatter win" that is given when one or more of predetermined symbols are shown on the symbol display SD although they are scattered.

The symbols SB may include ordinary symbols and special symbols including a wild symbol, a feature symbol, and a top symbol, for example. The wild symbol can substitute for any other symbol except for the feature symbol to create a winning combination. A predetermined number of the feature symbols may trigger a free mode of the game, and, according to an embodiment of the present invention, the feature symbols may serve as scatter symbols that provide a scatter win. The top symbol may provide a higher probability of forming a winning combination than other symbols. According to an embodiment of the present invention, two or more top symbols arranged in sequence on a payline from the first symbol strip SS1 to right may form a winning combination although three or more of the same symbols, other than the top symbols and the feature symbols, arranged in sequence on a payline from the first symbol strip SS1 may form a winning combination.

FIG. 1 shows various exemplary symbols including picture symbols SB1, character symbols SB2, and functional symbols SB3. The picture symbols SB1 are denoted by pictures of a moose, a bear, a wolf, a beaver, and a woodpecker, and the character symbols SB2 are denoted by "9," "10," "J," "Q," "K," and "A." The functional symbols SB3 include a feature symbol SB31 denoted by "FEATURE" and a wild symbol SB32 denoted by "WILD." Among the picture symbols SB1, a moose symbol S11 may serve as a top symbol.

As described above, the game may be executed in a normal mode or a free mode. Although a player playing in the normal mode may be required to bet some coins or credits on each game round in the normal mode, the free mode may not require a player's betting. The game rounds in the free mode may include a first-type free round and a second-type free round that use different sets of symbols SB. The symbol sets for the free rounds may be also different from the symbol set used in the normal rounds.

According to an embodiment of the present invention, each of the symbol sets for the free rounds may include additional symbols in addition to symbols in the symbol set for the normal rounds. The additional symbols for the first-type free rounds may be different from the additional symbols for the first-type free rounds.

According to an embodiment of the present invention, referring to FIG. 1, a first symbol set used in the normal rounds may include all kinds of symbols including the feature symbols SB31, the wild symbols SB32, and the top symbols SB11. The feature symbols SB31 may be disposed only in the first to third symbol strips.

A second symbol set used in the first-type free rounds may include a predetermined number, for example, four additional wild symbols SB32 in addition to all symbols in the first symbol set. A third symbol set used in the second-type free rounds may include a predetermined number, for example, four additional top symbols SB11 in addition to all symbols in the first symbol set.

According to an embodiment of the present invention, the four additional wild symbols SB32 in the second symbol set may be spread on the second to fourth symbol strips SS2-SS5 so that each of the second to fourth symbol strips SS2-SS5 may include one of the four additional wild symbols SB32. The four additional top symbols SB11 in the third symbol set may be placed on the first symbol strip SS1 from which the paylines start.

The input unit IN includes a plurality of buttons BT, for example, a bet button B1 and a spin button S1 that are operable by a player. The bet button B1 is used for betting on a game, and the spin button B2 is used for spinning the reels RL to get a new arrangement of the symbols SB (or for starting the game).

The controller CN receives inputs from the input unit IN and controls the symbol display SD with the symbols SB in response to inputs from the input unit IN.

Now, a gaming method according to one or more embodiments of the present invention is described in detail with reference to FIG. 3 to FIG. 9 as well as FIG. 1 and FIG. 2.

Figure 3:
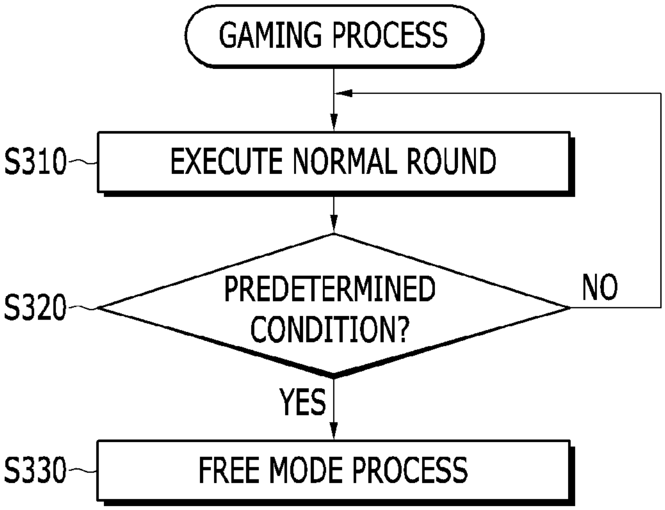
FIG. 3 is a schematic flow chart illustrating a gaming method according to an embodiment of the present invention.
Figure 4:
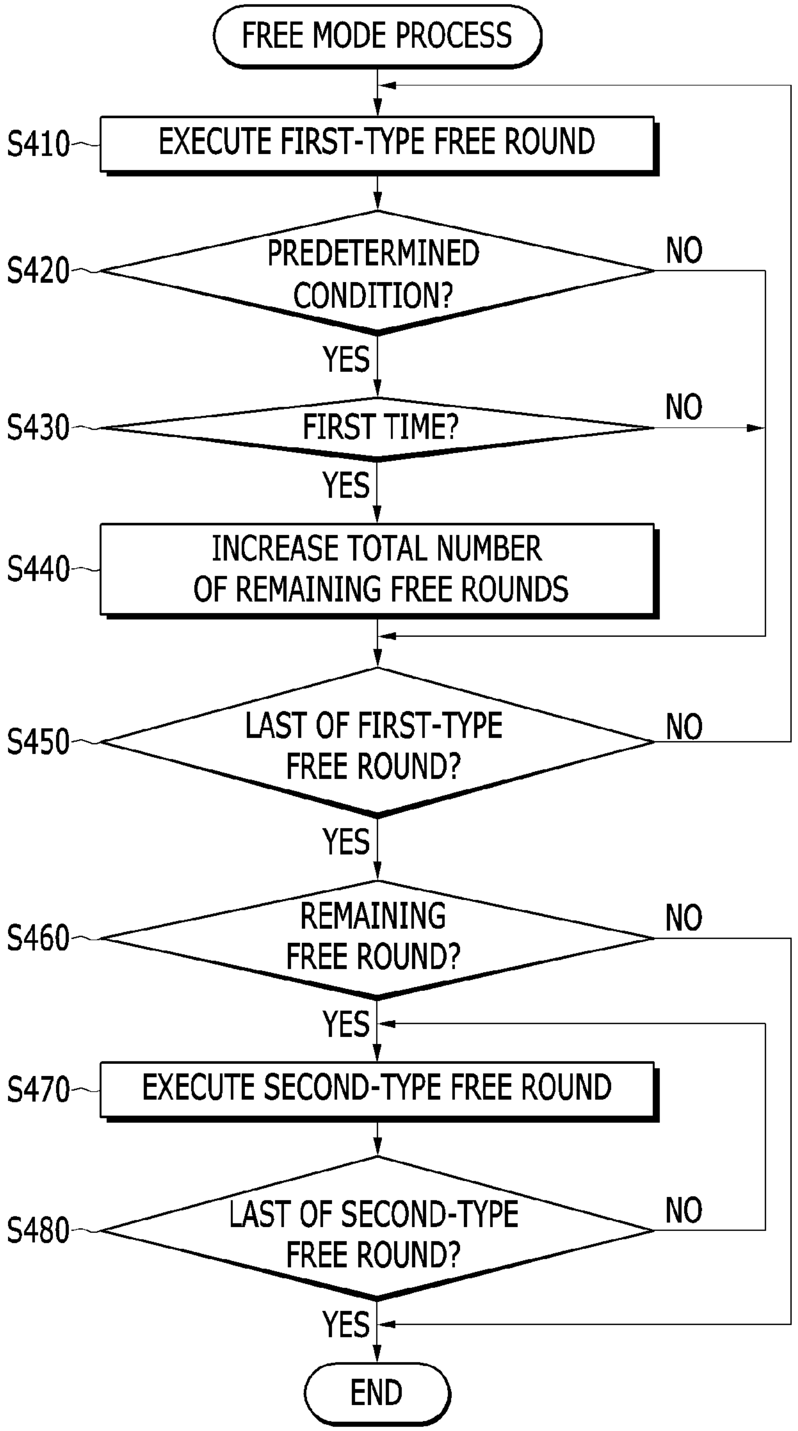
FIG. 4 is a schematic flow chart illustrating a free mode gaming according to an embodiment of the present invention.
Figure 5:
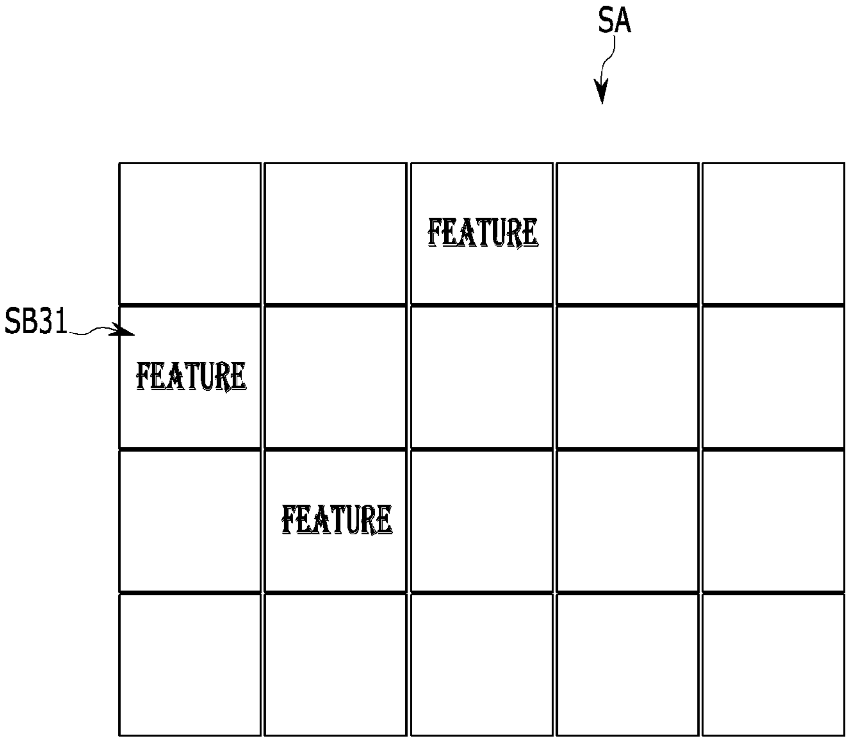
FIG. 5 shows an exemplary symbol arrangement satisfying a predetermined condition according to an embodiment of the present invention.
Figure 6:
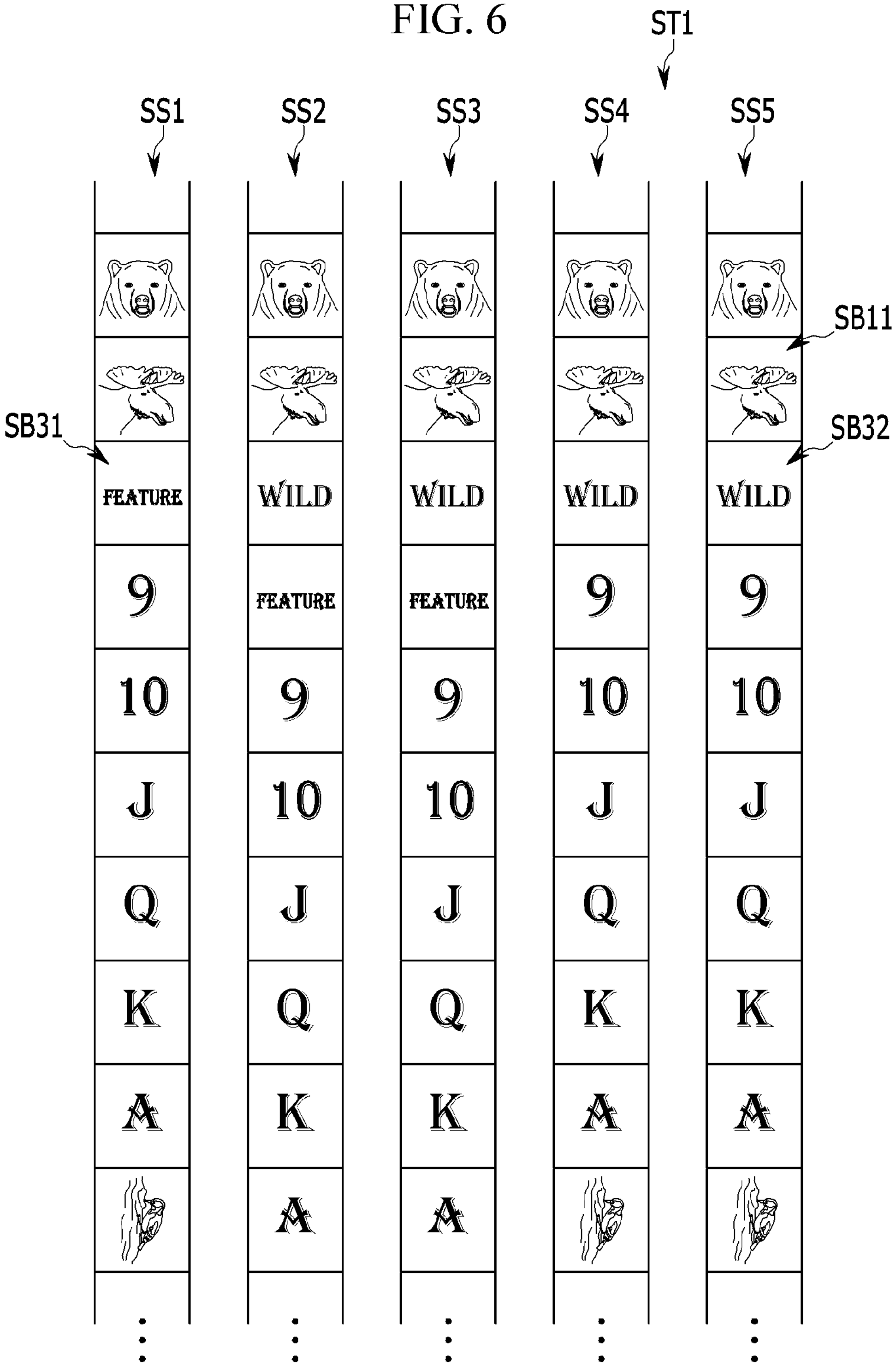
FIG. 6 shows an exemplary first set of symbol strips used in a normal round of a game according to an embodiment of the present invention.
Figure 7:
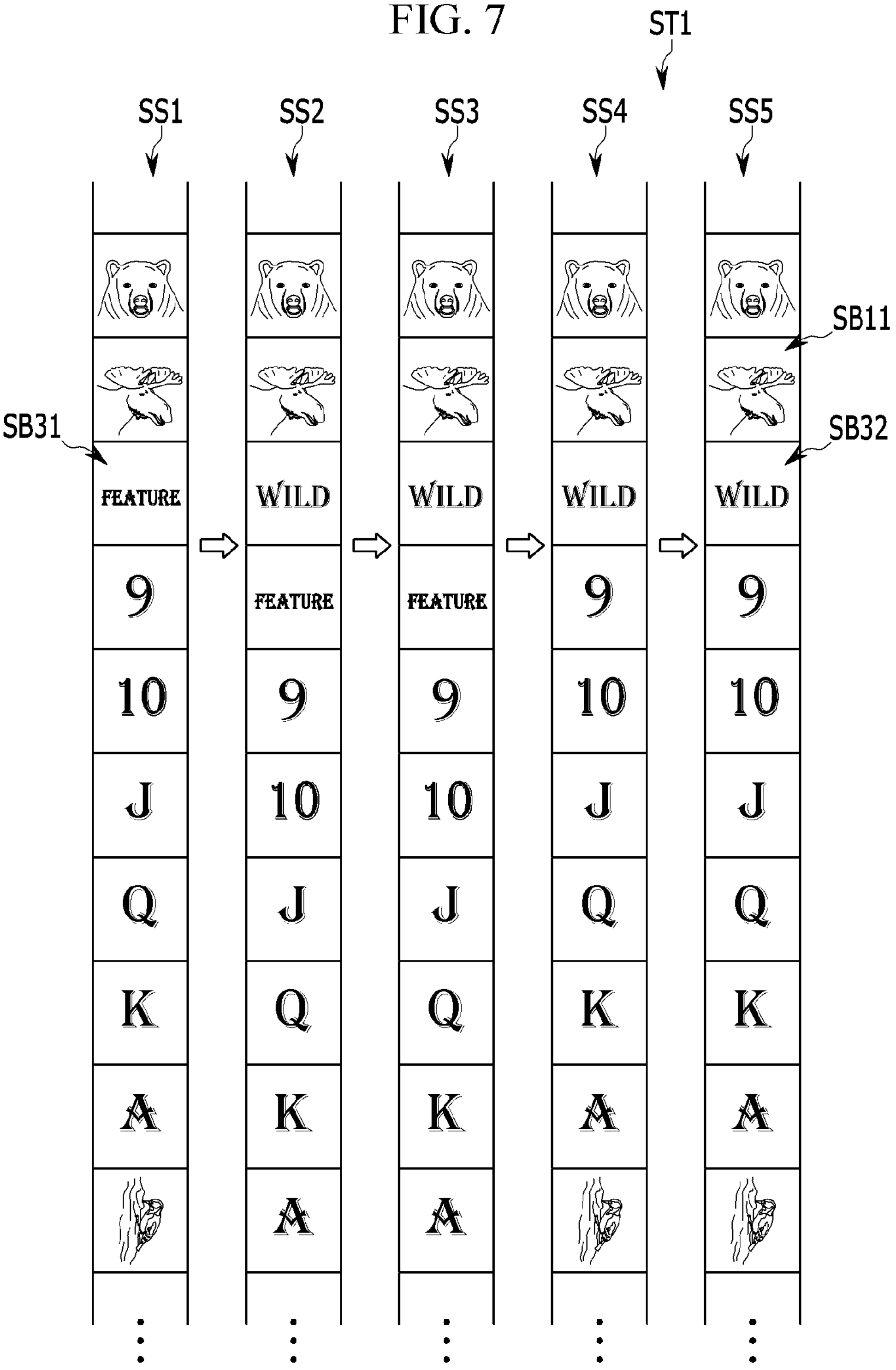
FIG. 7 shows an example of forming an exemplary second symbol set used in a first-type free round of the game from the first symbol set shown in FIG. 6 according to an embodiment of the present invention.
Figure 8:
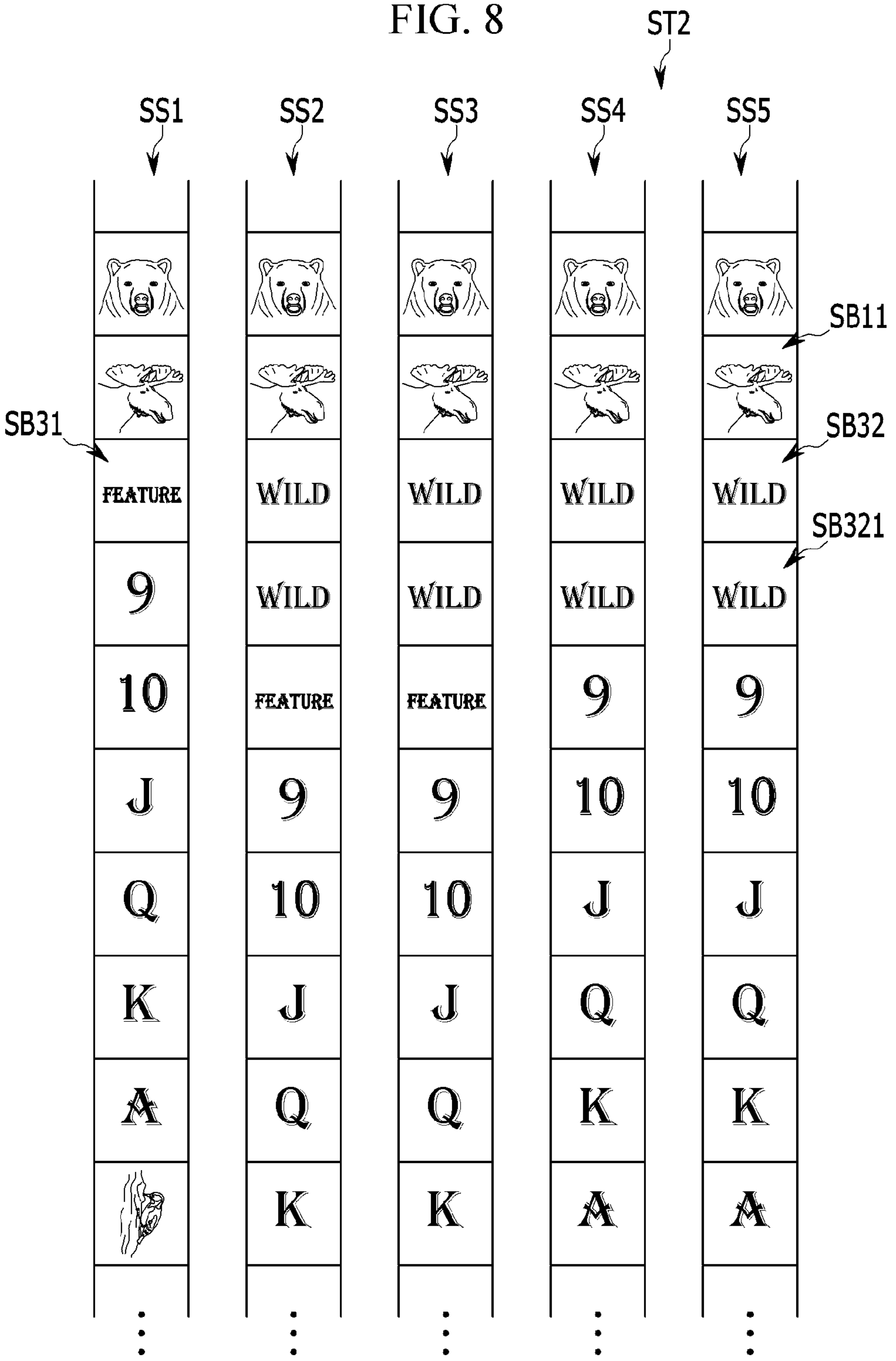
FIG. 8 shows the second symbol set formed by a method shown in FIG. 7 according to an embodiment of the present invention.
Figure 9:
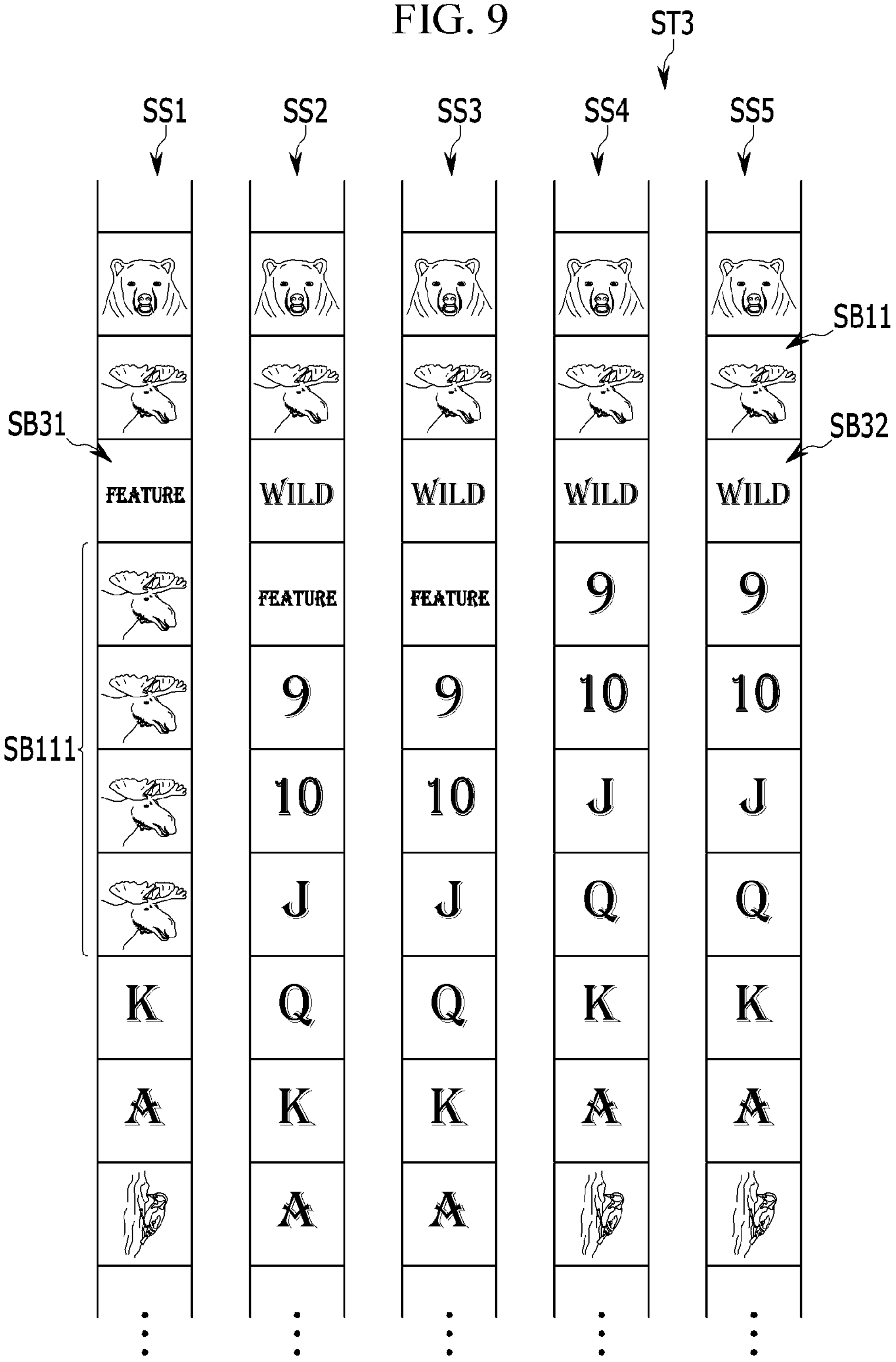
FIG. 9 shows an exemplary third symbol set used in a second-type free round of the game according to an embodiment of the present invention.

FIG. 3 is a schematic flow chart illustrating a gaming method according to an embodiment of the present invention, FIG. 4 is a schematic flow chart illustrating a free mode gaming according to an embodiment of the present invention, FIG. 5 shows a symbol arrangement satisfying a predetermined condition according to an embodiment of the present invention, FIG. 6 shows an exemplary first symbol set used in a normal round of a game according to an embodiment of the present invention, FIG. 7 shows an example of forming an exemplary second symbol set used in a first-type free round of the game from the first symbol set shown in FIG. 6 according to an embodiment of the present invention, FIG. 8 shows the second symbol set formed by a method shown in FIG. 7 according to an embodiment of the present invention, and FIG. 9 shows an exemplary third symbol set used in a second-type free round of the game according to an embodiment of the present invention.

The controller CN of the gaming machine 1 make the symbol display SD display a plurality of symbols SB before starting a game.

Referring to FIG. 3, the controller CN executes a normal round of the game in response to inputs from a player (S310). The normal round may use a first symbol set ST1 an example of which is shown in FIG. 6, and each symbol strip SS1-SS5 in the first symbol set ST1 may include at least one wild symbol SB32 according to an embodiment of the present invention. Each symbol strip SS1-SS5 in the first symbol set ST1 may further include at least one top symbol SB11 according to an embodiment of the present invention. According to an embodiment of the present invention, first to third symbol strips SS1-SS3 in the first symbol set ST1 may further include respective feature symbols SB31. However, the first symbol set ST1 shown in FIG. 6 is merely an example thereof, and it is not limited thereto.

The inputs from the player may include an input from the bet button B1 and another input from the spin button B2. The player may determine a bet amount by pressing the bet button B1, and starts the normal round of the game by pressing the spin button B2.

Upon Receipt of the input from the spin button B2, the controller CN may select a symbol arrangement from the first symbol set ST1 to be displayed on a symbol display SD, for example, by using a random number generator (not shown). The controller CN may further determine whether one or more winning combinations or scatter symbols are present in the symbol arrangement.

In addition, the controller CN determines whether a first predetermined condition is satisfied (S320). According to an embodiment of the present invention, the controller CN may determine, as the first predetermined condition, whether the symbol arrangement includes a predetermined number of feature symbols SB31. According to another embodiment, the controller CN may determine, as the first predetermined condition, whether a feature symbol SB31 is included in each of first to third columns (or symbol strips) in the symbol arrangement. FIG. 5 shows an exemplary symbol arrangement SA that includes one feature symbol SB31 in each of the first to third columns.

When the first predetermined condition is not satisfied (S320: NO), the controller CN executes another normal round of the game (S310).

However, when the first predetermined condition is satisfied (S320: YES), for example, when the first to third columns in the symbol arrangement include respective feature symbols SB31 as shown in FIG. 5, the controller CN triggers a free mode process (S330).

In the free mode process, the controller CN runs first-type free rounds of the game a first number of times, for example, ten times. The first-type free rounds may use a second symbol set ST2 different from the first symbol set ST1, and an example of the symbol set ST2 is shown in FIG. 8. According to an embodiment of the present invention, the second symbol set ST2 may include additional wild symbols SB321 in addition to all symbols in the first symbol set ST1 so that second to fifth symbol strips SS2-SS5 in the second symbol set ST2 may include respective additional wild symbols SB321. Referring to FIG. 7, each of the four additional wild symbols SB321 may be inserted into a position (denoted by an arrow) under a wild symbol SB32 in the first symbol set ST1, thereby forming the second symbol set ST2 shown in FIG. 8.

In addition, the controller CN further runs second-type free rounds of the game by a second number of times, for example, five times under a predefined circumstance in the free mode process. The second-type free rounds use a third symbol set ST3 different from the first symbol set ST1 and the second symbol set ST2, and an example of the third symbol set ST3 is shown in FIG. 9. According to an embodiment of the present invention, the third symbol set ST3 may include additional top symbols SB111 in addition to all the symbols in the first symbol set ST1 so that one of the symbol strips SS1-SS5 in the third symbol set ST3 may include all of the additional top symbols SB111. According to another embodiment of the present invention, a first symbol strip SS1 in the third symbol set ST3, from which paylines start, may include four additional top symbols SB111. For example, the four top symbols SB41 may be inserted together into a position of the first symbol strip SS1 in the first symbol set ST1, thereby forming the third symbol set shown in FIG. 9.

Referring to FIG. 4, the controller CN executes a first-type free round (S410), and determines whether a second predetermined condition is satisfied (S420). According to an embodiment of the present invention, the second predetermined condition may be substantially the same as the first predetermined condition. For example, the controller CN determines whether a feature symbol SB31 is included in each of first to third columns in a symbol arrangement determined in the execution of the first-type free round, as shown in FIG. 5.

When the second predetermined condition is satisfied (S420: YES), the controller CN determines whether the second predetermined condition in the free mode process is satisfied for the first time (S430). When it is determined that the second predetermined condition in the free mode process is satisfied for the first time (S430: YES), the controller CN increases a total number of remaining free rounds (S440) by a second number so that the free rounds may be executed a sum of the first number and the second number of times.

However, when the second predetermined condition is not satisfied (S420: NO) or when the second predetermined condition in the free mode process has been satisfied before (S430: NO), the controller CN skips the operation illustrated in S440.

Thereafter, the controller CN determines whether a current first-type free round is the last one (S450), i.e., whether the execution of the first number of the first-type free rounds are completed.

When the current first-type free round is not the last one (S450: NO), the controller CN executes another first-type free round of the game (S410).

However, when the current first-type free round is the last one (S450: YES), the controller CN determines whether there are remaining free rounds (S460).

When there are remaining free rounds (S460: YES), the controller CN executes a second-type free round (S470), and determines whether a current second-type free round is the last one (S480), i.e., whether the execution of the second number of the second-type free rounds are completed.

When the current second-type free round is not the last one (S480: NO), the controller CN executes another second-type free round of the game (S470).

However, when the current second-type free round is the last one (S480: YES) or when there is no remaining free round (S460: NO), the controller CN ends the free mode process (S490).

Outline of Gaming Machine

A gaming machine according to another embodiment of the present invention is described with reference to FIG. 10 to FIG. 17.

Figure 10:
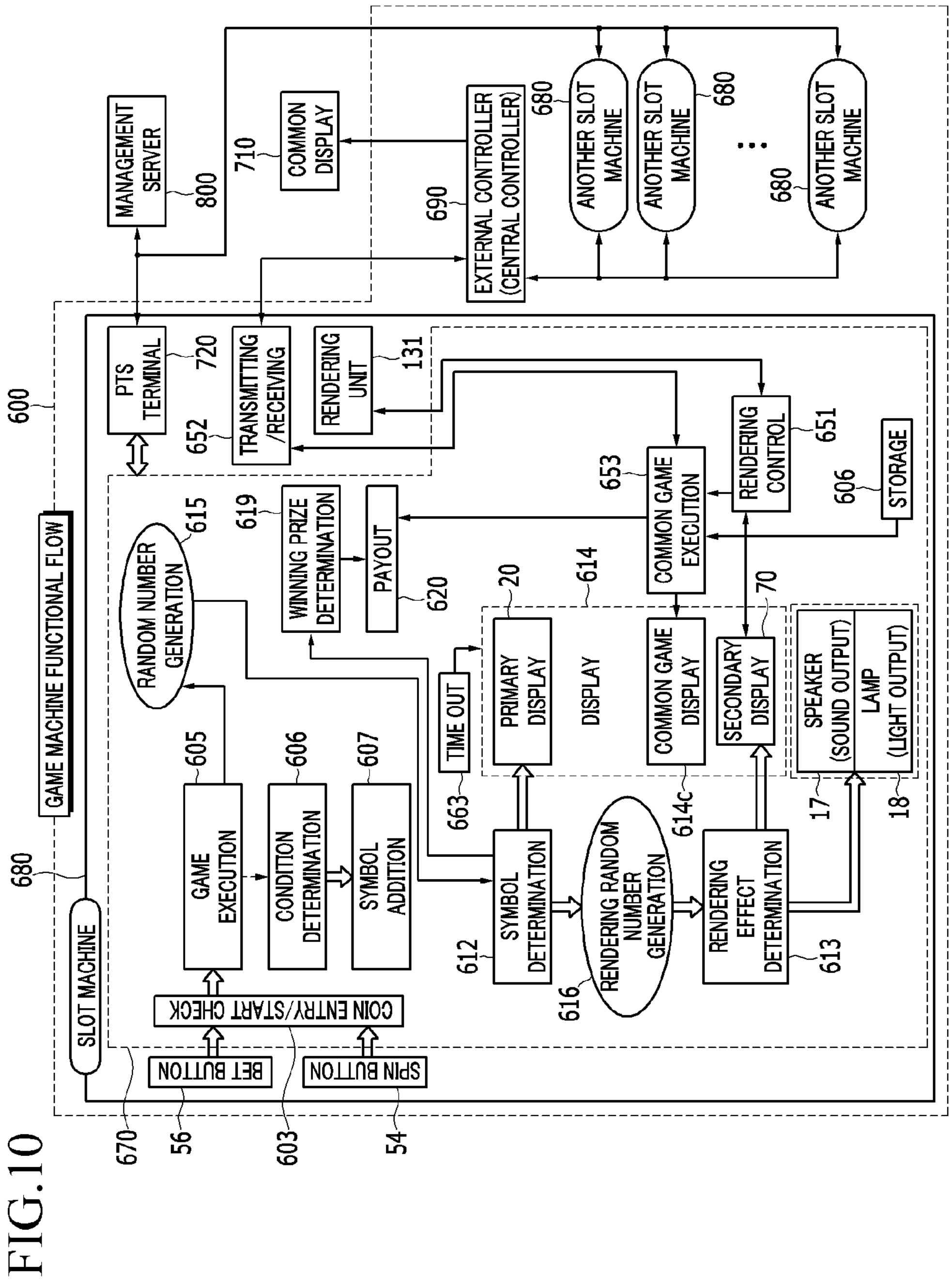
FIG. 10 is a schematic block diagram of an exemplary gaming machine showing a functional flow of the gaming machine according to an embodiment of the present invention.
Figure 11:
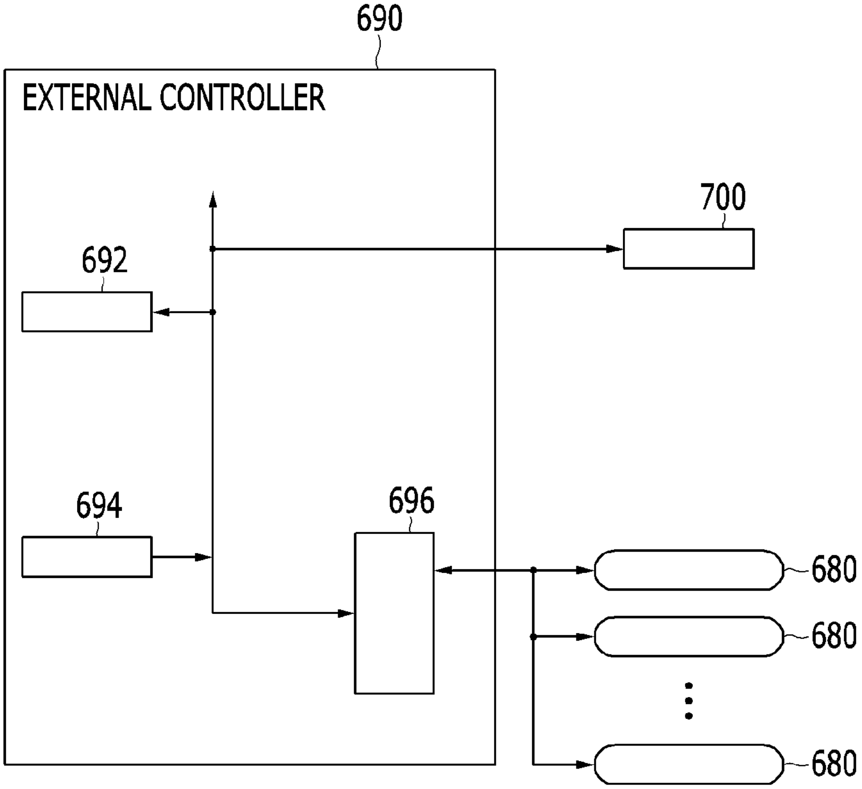
FIG. 11 is a schematic block diagram of an exemplary external controller showing a functional flow of the gaming machine shown in FIG. 10 according to an embodiment of the present invention.
Figure 12:
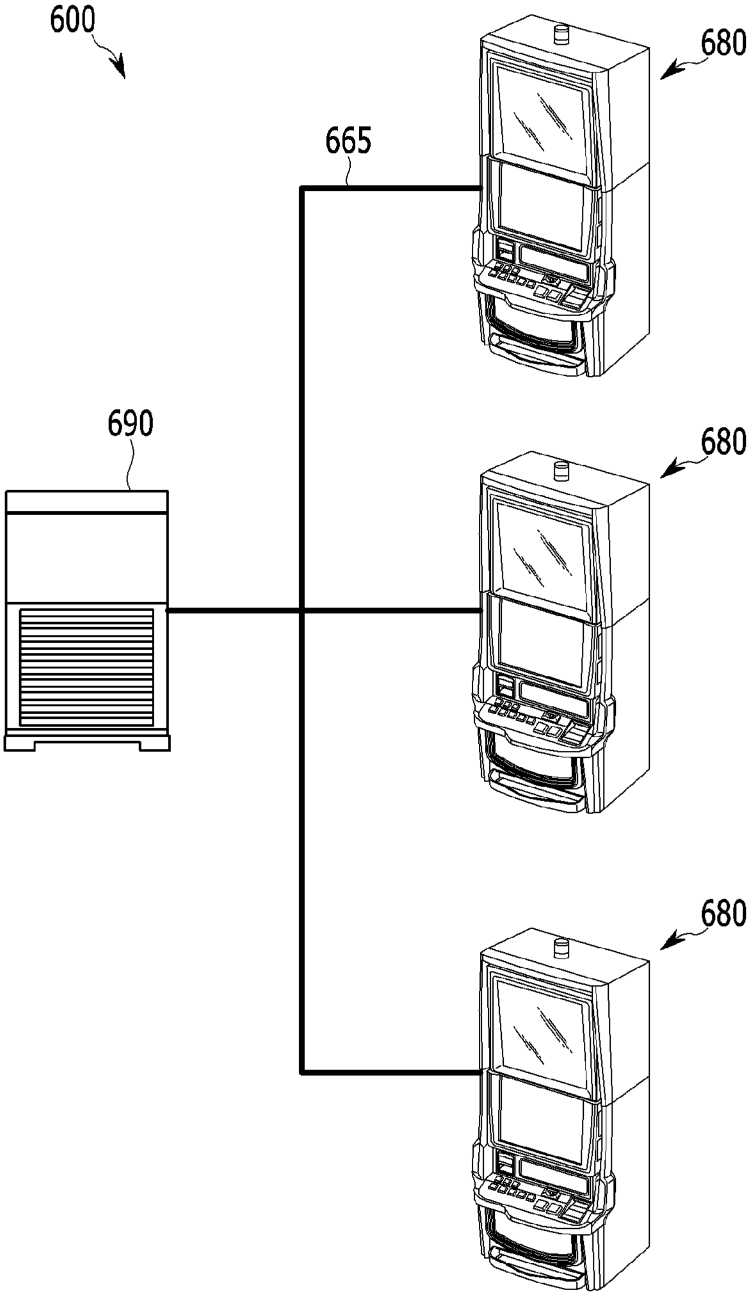
FIG. 12 is a schematic perspective view of the gaming machine shown in FIG. 10.
Figure 13:
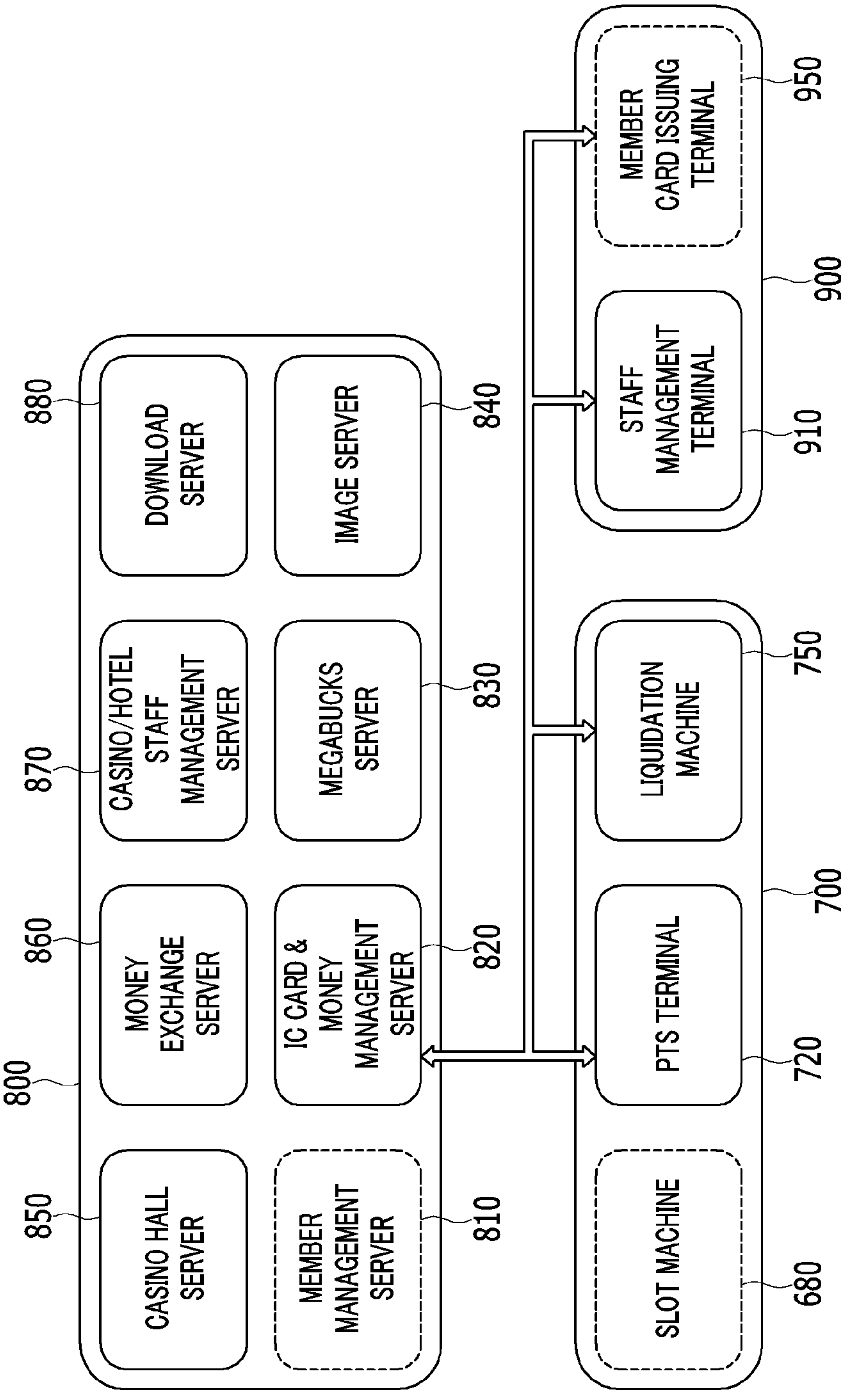
FIG. 13 is a schematic block diagram of an exemplary gaming system according to an embodiment of the present invention.
Figure 14:
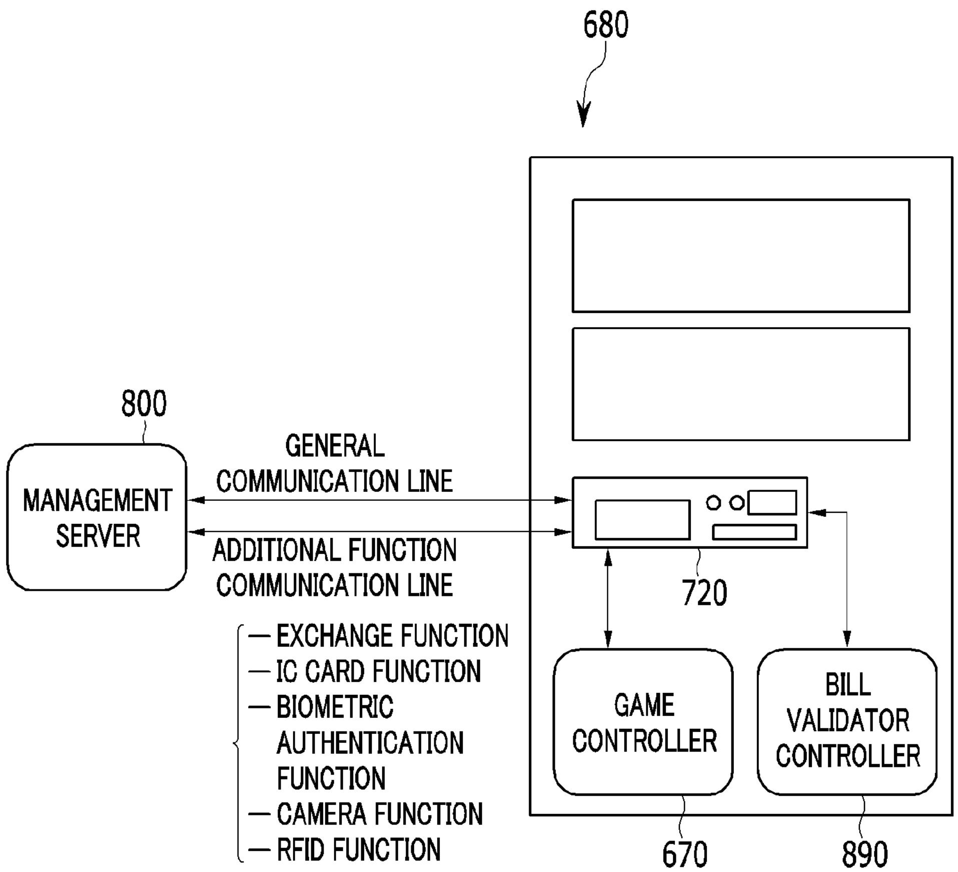
FIG. 14 is a schematic block diagram of an exemplary PTS system for a gaming machine according to an embodiment of the present invention.
Figure 15:
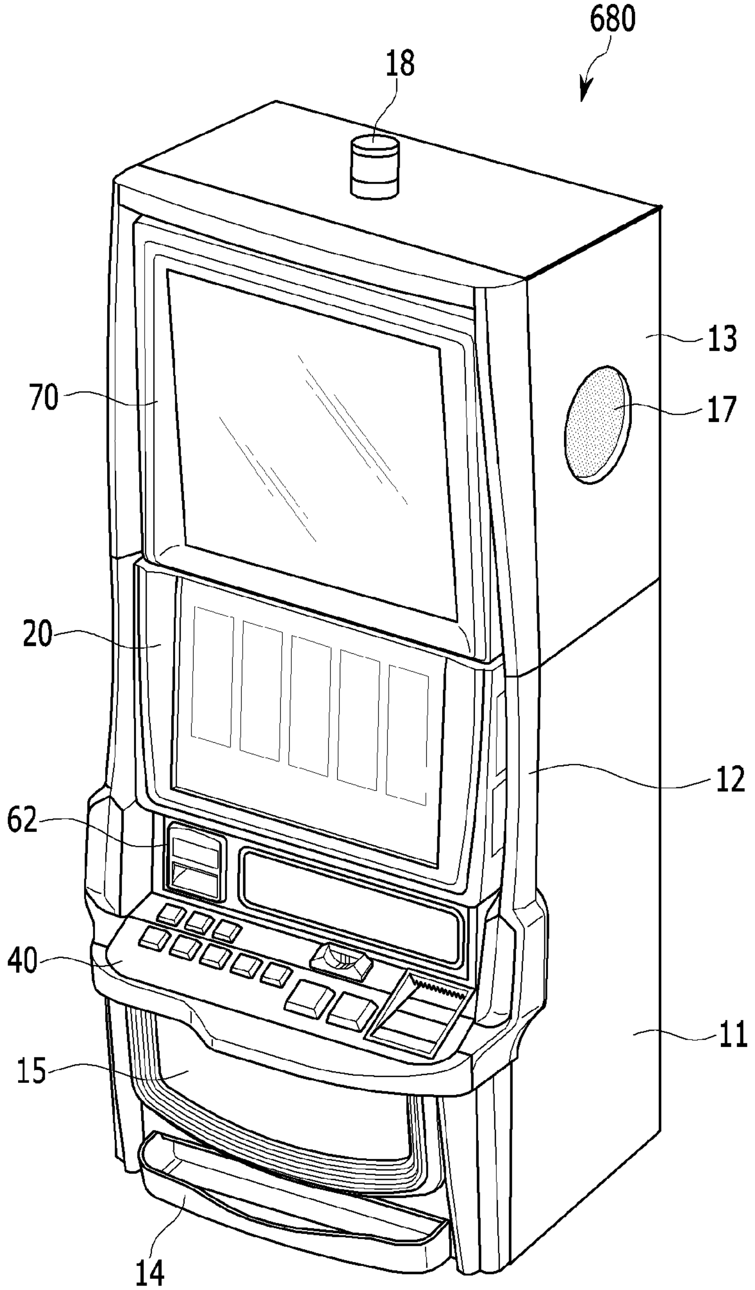
FIG. 15 is a schematic perspective view of an exemplary slot machine in a gaming machine according to an embodiment of the present invention.
Figure 16A:
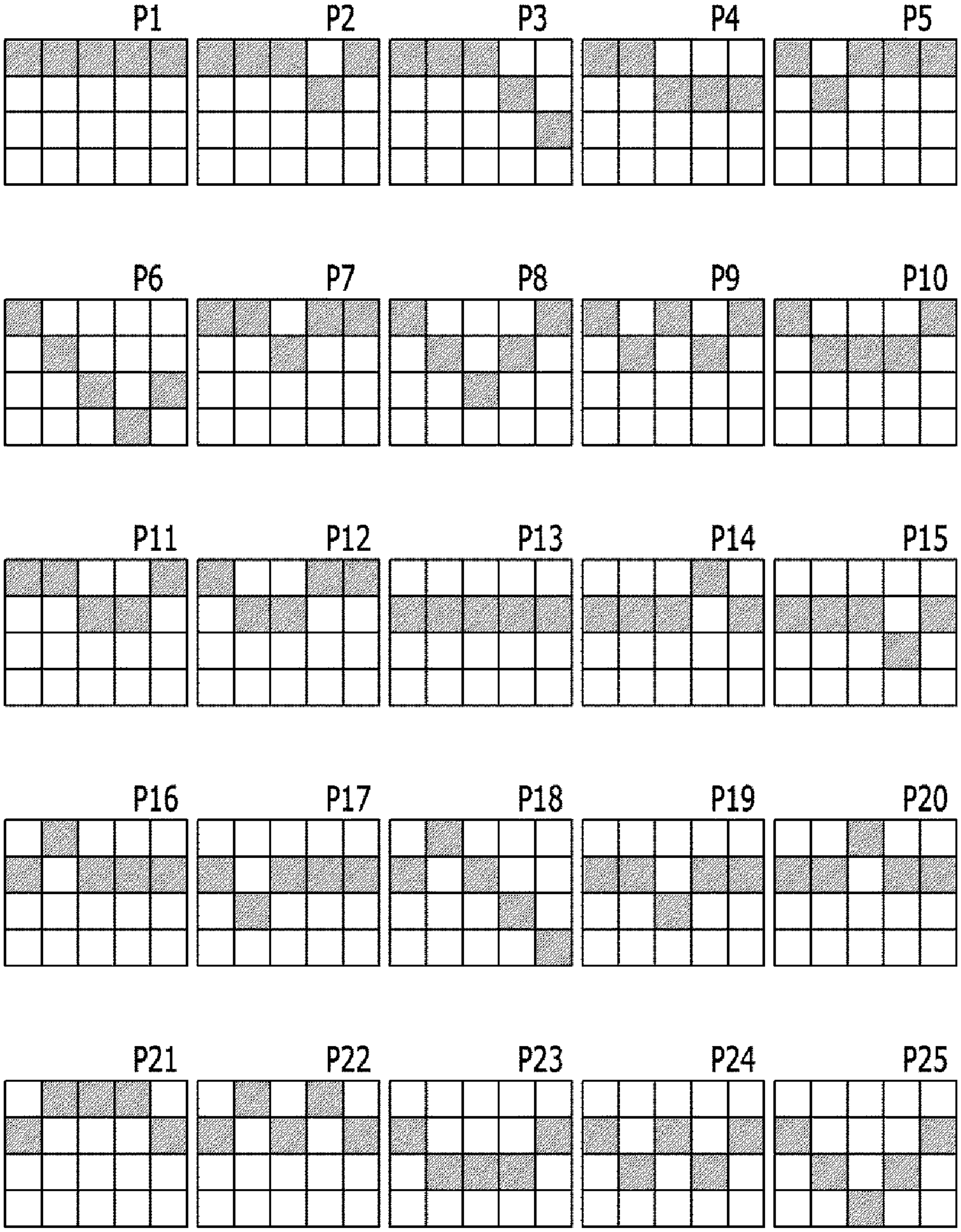
FIG. 16A and FIG. 16B are schematic layout views of exemplary paylines for a slot machine according to an embodiment of the present invention.
Figure 16B:
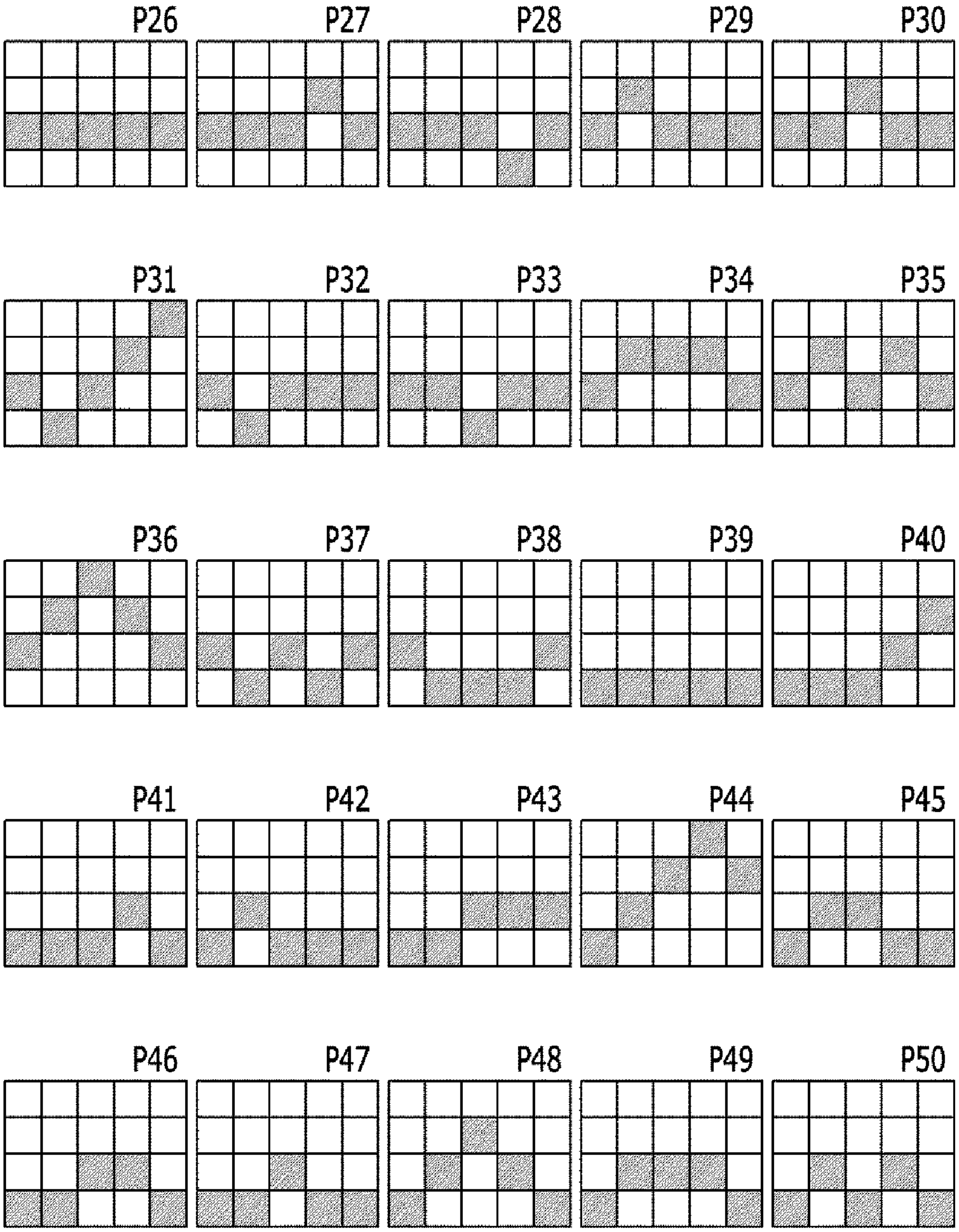
Figure 17:
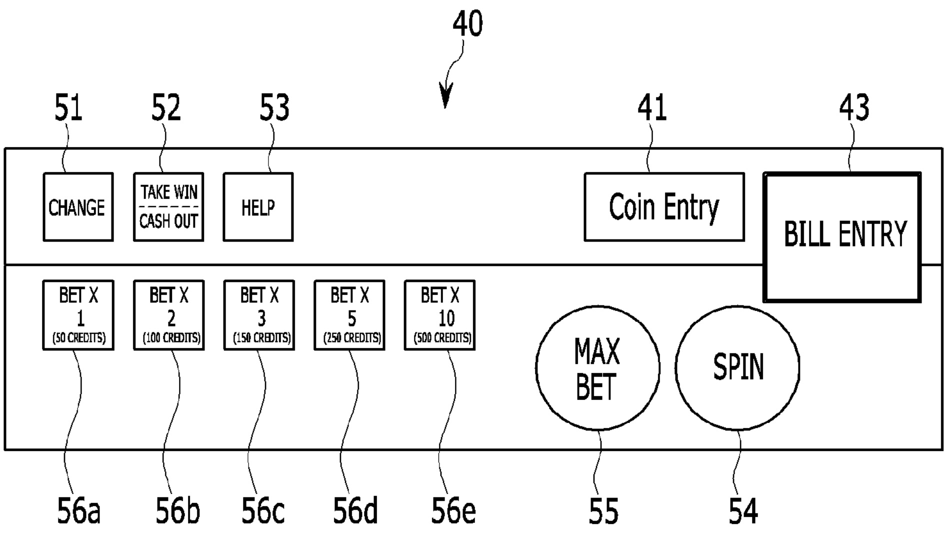
FIG. 17 is a schematic layout view of an exemplary control panel of a slot machine showing a button layout according to an embodiment of the present invention.

FIG. 10 is a schematic block diagram of an exemplary gaming machine showing a functional flow of the gaming machine according to an embodiment of the present invention, FIG. 11 is a schematic block diagram of an exemplary external controller showing a functional flow of the gaming machine shown in FIG. 10 according to an embodiment of the present invention, FIG. 12 is a schematic perspective view of the gaming machine shown in FIG. 10, FIG. 13 is a schematic block diagram of an exemplary gaming system according to an embodiment of the present invention, FIG. 14 is a schematic block diagram of an exemplary PTS system for a gaming machine according to an embodiment of the present invention, FIG. 15 is a schematic perspective view of an exemplary slot machine in a gaming machine according to an embodiment of the present invention, FIG. 16A and FIG. 16B are schematic layout views of exemplary paylines for a slot machine according to an embodiment of the present invention, and FIG. 17 is a schematic layout view of an exemplary control panel of a slot machine showing a button layout according to an embodiment of the present invention.

Functional Flow of Gaming Machine: Slot Machine

Referring to FIG. 10, a gaming machine 600 according to an embodiment of the present invention includes a plurality of slot machines 680 and an external controller (or a central controller) 690 connected to the plurality of slot machines 680 such that the external controller 690 may perform data communication with the plurality of slot machines 680.

Each of the slot machines 680 includes a display unit 614, a player tracker system (PTS) terminal 720, bet buttons 56, a spin button 54, a speaker 17, a lamp 18, and a game controller 670 controlling thereof. The slot machine 680 further includes a transceiver 652 for data communication with the external controller 690.

The bet buttons 56 and the spin button 54 are input elements that operate by pushing or pressing of a player. The bet buttons 56 are configured to accept a bet amount, and the spin button 54 is configured to accept start of a game.

The display unit 614 displays still images related to a plurality of symbols used in gaming, numbers, or signs and moving images such as a rendering image. The display unit 614 includes a primary display 20, a secondary display 70, and a common game display 614*c*. The primary display 20 displays symbols for a game, and the secondary display 70 displays a variety of images and information related to the game. The common game display 614*c* is adapted to display a common game such as a jackpot game, for example.

The game controller 670 includes a coin insertion/start check unit 603, a game execution unit 605, a condition determination unit 606, a symbol addition unit 607, a random number generator 615, a symbol determining unit 612, a rendering random number generator 616, a rendering effect determining unit 613, a winning prize determining unit 619, and a payout unit 620.

The game execution unit 605 may be configured to execute a game in a normal round or a free round. The condition determination unit 606 may determine whether a condition for executing a first-type free round or for a first-type free round of the game is satisfied. For example, when three or more feature symbols are shown in first to third symbol strips of a symbol arrangement in a normal round, the condition determination unit 606 may cause the symbol addition unit 607 to add wild symbols into the second symbol strip to a fifth symbol strip. When three or more feature symbols are shown in first to third symbol strips of a symbol arrangement in a first-type free round, the condition determination unit 606 may cause the symbol addition unit 607 to add top symbols to the first symbol strip.

The symbol determining unit 612 is configured: to determine a symbol arrangement using random numbers generated by the random number generator 615; to output the symbol arrangement to the primary display 20 of the display unit 614 to display the symbol arrangement thereon; to output information on the symbol arrangement to the winning prize determining unit 619; and to output information on the symbol arrangement to urge the rendering random number generator 616 to generate a random number for selecting a rendering mode based on the symbol arrangement.

The rendering random number generator 616 is configured: to generate a random number for rendering selection in response to the output from the symbol determining unit 612; and to output the generated random number to the rendering mode determining unit 613. The rendering mode determining unit 613 is configured: to determine the rendering mode with the use of the random number from the rendering random number generator 616; to output the determined rendering mode to the secondary display 70 of the display unit 614; and to output sound/lighting information of the determined rendering mode to the speaker 617 and the lamp 618.

The winning prize determining unit 619 is configured to determine the presence or absence of a winning prize based on the arrangement of the symbols displayed on the primary display 20; to calculate a payout amount based on the types of wins and betting amount; and to output a payout signal that informs of the payout amount to the payout unit 620. The payout unit 620 is configured to pay out the amount to a player in a form of a coin, a medal, a credit, or the like. In addition, the payout unit 620 is configured to add credit data based on a credit to be paid out to the credit that is stored in an IC card 500 inserted into a PTS terminal 720 to be described later.

Furthermore, the game controller 670 includes a storage 661 configured to store a variety of bet amount data. The storage 661 is a device configured to store data contained in a hard disk unit or a memory in a rewritable manner.

Moreover, the game controller 670 includes a common game execution unit 653. The common game executing unit 653 is configured to output bet amount information that is based on a bet amount betted in a game to the external controller 690 every time unit game is played; to execute a common game by means of a game start command from the external controller 690; and to accept a BET input by means of the bet buttons 56 as to a bet amount that corresponds to data on a bet amount data for common game that can be betted in a common game.

The game controller 670 is connected to the PTS terminal 720. The PTS terminal 720 may be configured to communicate with the game controller 670, for example, to send credit data, for example. The game controller 670 may update credits written on the display unit 614 when the credit controller receives the credit data from the PTS terminal 720. The game controller 670 may output liquidation credit data to the PTS terminal 720 in a case where a game liquidation has occurred.

The PTS terminal 720 is connected to a management server 800 to enable communication therewith, and integrally performs image downloading or management of IC card or credit.

Functional Flow of Gaming Machine: External Control Device

Referring to FIG. 11, the slot machines 680 are connected to an external controller 690. The external controller 690 has a function of remotely operating and remotely monitoring an operating state of each slot machine 680 or a processing operation such as changing a variety of game setting values. Furthermore, the external controller 690 has a function of determining a common game start condition for each game terminal and then executing a common game in a plurality of slot machines 680 when a determination result satisfying the common game start condition has been obtained in any of the game terminals.

The external controller 690 includes a common game start unit 694, a game terminal selecting unit 692, and a transceiver 696 (not shown).

The common game start unit 694 is configured: to determine whether or not a common game start condition is established, based on a cumulative value of bet amount information that is transmitted from a slot machine 680 in each game round; to output a game start command to a plurality of slot machine 680; and to display a state that is established until the common game start condition has been established on the common display device 700.

Determination of whether or not the common game start condition is established may be made based on all of the cumulative values that are obtained by repetition of a unit game as well as based on a cumulative value of bet amount information. For example, the number of games or a game playing time and the like may be a cumulative value.

Furthermore, the common game start unit 694 is configured to output a game start command to a slot machine 680 in which a cumulative value increasing due to repetition of a game satisfies a game execution condition. In this manner, the common game start unit 694 enables a player to have a consciousness to actively repeat a game because a qualification to participate in a common game is not provided to a slot machine 680 whose cumulative value is less than a minimum setting value.

Furthermore, the common game start unit 694 is configured to monitor a non-input time during which no start operation is made and then outputting a game start command to the slot machines 680 other than a slot machine 680 whose non-input time is more than a timeout time. In this manner, the common game start unit 694 is capable of determining that a player is absent as to a slot machine 680 in which no game is executed over a timeout time or more, and is capable of avoiding execution of a common game for such a slot machine 680.

The game terminal selecting unit 692 has a function of selecting a specific slot machine 680 from among a plurality of slot machines 680 and then outputting a common game start command signal to the specific slot machine 680. The transceiver 696 has a function enabling transmission/reception of data to/from the slot machine 680.

Entire Configuration of Game System

A game system that includes gaming machines 600 having the respective functions described above is described.

Referring to FIG. 12, a gaming machine 600 includes a plurality of slot machines 680 and an external controller 690 that is connected to each of the slot machines 680 via a communication line 665.

The external controller 690 is configured to control a plurality of slot machines 680. In the embodiment of the present invention, the external controller 690 is a so called hall server that is installed in a gaming facility having a plurality of slot machines 680. Each of the slot machines 680 has its own identification number assigned thereto, and the external controller 690 determines a source of data to be transmitted from each of the slot machines 680, in accordance with the assigned identification number. In addition, in a case where data is transmitted from the external controller 690 to a slot machine 680 as well, a transmission destination is specified with the use of the assigned identification number.

A game system may be configured in one gaming facility that is capable of performing a variety of games, such as a casino, or may be constructed across a plurality of gaming facilities. In a case where the game system is constructed in one gaming facility, the game system may be constructed every floor or every section in the gaming facility. The communication line 665 may be wired or wireless, and a leased line or a switched line and the like can be employed.

Referring to FIG. 13, a game system is divided into three blocks, i.e. a management server block 800, a customer terminal block 700, and a staff terminal block 900. The management server block 800 includes a casino hall server 850, a money exchange server 860, a casino/hotel staff management server 870, and a download server 880.

The casino hall sever 850 is a server configured to manage an entire casino hall in which slot machines 680 have been installed. The money exchange server 860 is a server configured to prepare money exchange rate data based on money exchange information. The casino/hotel staff management server 870 is a server configured to manage staffs in a casino hall or a hotel associated with the casino hall. The download server 880 is a server configured to download information relating to games or the latest information such as news and then broadcast the downloaded information to players through the PTS terminals 700 of a variety of slot machines 680.

In addition, the management server block 800 has a member management server 810, an IC card & money management server 820, a megabucks server 830, and an image server 840.

The member management server 810 is a server configured to manage members information on a player who plays a game at a slot machine 680. The IC card & money management server 820 is a server configured to manage an IC card 500 used in a slot machine 680. Specifically, the IC card & money management server 820 is a server configured to store fraction money data to be associated with an identification code or to output the fraction money data to the PTS terminal 720. The IC card & money management server 820 is also configured to prepare and manage denomination data or the like. The megabucks server 830 is a server configured to manage megabucks serving as games in which a total amount of betted money in a plurality of slot machines 680 installed in a plurality of casino hall is determined as a prize. The image server 840 is a server configured to download an image relating to a game or a latest image such as news, for example, and then, broadcast the downloaded image to players through the PTS terminal 720 of a variety of slot machines 680.

The customer terminal block 700 has a slot machine 680, a PTS terminal 720, and a liquidation machine 750. The PTS terminal 700 can be mounted on the slot machine 680 and can communicate with the management server 800. The liquidation machine 750 is a machine configured to cash out and liquidate money data that is stored in an IC card 500 that a player owns or to store a coin or a bill as money data in the IC card 500.

The staff terminal block 900 has a staff management terminal 900 and a member card issuing terminal 950. The staff management terminal 900 is a terminal for staffs in a casino hall to manage a variety of slot machines 680. In particular, in the case of the embodiment of the present invention, the staffs in a casino hall manage whether too many IC cards 500 are stocked in the PTS terminal 720 or the number of IC cards 500 is insufficient. The member card issuing terminal 950 is a terminal for a player who plays a game in a casino hall to use when issuing a member card.

PTS Terminal

Referring to FIG. 14, a PTS terminal 720 is incorporated in a PTS system. The PTS terminal 720 that is mounted on a slot machine 680 is connected to a game controller 670 and a bill validator controller 890 of the slot machine 680 to enable communication therewith.

The PTS terminal 720 performs rendering of a game by means of sound or image and the like or updating of credit data in communication with the game controller 670. In addition, the PTS terminal 720 transmits credit data required for liquidation in communication with the bill validator controller 890.

In addition, the PTS terminal 720 is connected to a management server 800 to enable communication therewith. The PTS terminal 720 communicates with the management server 800 between two lines, i.e., between a general communication line and an additional function communication line.

The PTS terminal 720 makes communication of data such as money data or identification code data or members information on players, for example, in the general communication line. On the other hand, the PTS terminal 720 makes communication relating to functions to be newly added in the additional function communication line. In the case of the embodiment of the present invention, the PTS terminal 720 makes communication relating to an exchange function, an IC card function, a biological authentication function, a camera function, or an RFID (Radio Frequency IDentification) function serving as a function of making solid identification with the use of radio waves.

Mechanical Configuration of Slot Machine

An exemplary structure of the slot machine 680 that includes elements other than those above listed is shown in FIG. 15, but the structure of the slot machine 680 is not limited thereto.

Referring to FIG. 15, the slot machine 680 includes a cabinet 11, a top box 12, a main door 13, a primary display 20, a secondary display 70, a control panel 40, a speaker 17, and a lamp 18.

The primary display 20 displays a symbol arrangement selected from a set of symbols SB including picture symbols SB1, character symbols SB2, and functional symbols SB3 as shown in FIG. 1. The symbols SB1 are denoted by pictures of a moose, a bear, a wolf, a beaver, and a woodpecker, and character symbols SB2 are denoted by "9," "10," "J," "Q," "K," and "A." The functional symbols SB3 include a feature symbol SB31 denoted by "FEATURE" and a wild symbol SB32 denoted by "WILD." The feature symbol SB32 may serve as a scatter symbol, and the moose symbol S11 may serve as a top symbol.

FIG. 16A and FIG. 16B show fifty paylines P1-P50 that are configured to establish winning combinations of the symbols in a symbol arrangement. Each of the paylines P1-P50 starts from a first column (or a first symbol strip) to a fifth column (or a fifth symbol strip) such that a predetermined number of the same symbols that are arranged from the first symbol strip along the payline P1-P50 form a winning combination. According to an embodiment of the present invention, a player may not be allowed to select some of the fifty paylines P1-P50, and may be forced to select all the fifty paylines P1-P50. However, embodiments are not limited thereto.

The symbols SB except for the feature symbols SB32 may form winning combinations when aligned along a payline P1-P50 while the feature symbols SB32 may form a scatter win when each of the first to third columns in a symbol arrangement includes at least one of the feature symbols SB32. The feature symbols SB32 may be disposed only in the first to third symbol strips. A minimum number of the same symbols required for a winning combination is two for the top symbol SB11 and three for other symbols.

According to an embodiment of the present invention, a winning combination including the symbols denoted by "9" or "10" may award a lowest prize except for the scatter win while a winning combination including the top symbols SB11 may award a highest prize.

Referring to FIG. 15 again, the primary display 20 may be disposed on an upper part of the main door 13 that may be provided on a front surface of the cabinet 11, and may include an LCD panel or an OLED panel. The primary display 20 may include a touch screen panel that enables a player to interact with the slot machine 680 by touching some areas on a screen.

The secondary display 70 displays images related to game information or images. The secondary display 70 may be disposed on a front surface of the top box that may be provided on the cabinet 11, and may include a display panel, for example, a liquid crystal display (LCD) panel or an organic light emitting display (OLED).

Referring to FIG. 15 and FIG. 17, the control panel 40 includes a plurality of buttons 51-55 and 56*a*-56*e*, a coin entry 41, and a bill entry 43, and may be disposed below the primary display 20.

The plurality of buttons 51-55 and 56*a*-56*e* may include a reserve button 51, a take win button (or collect button) 52, and a game-rules button (or help button) 53 that may be disposed on an upper stage of a left area of the control panel 40. The plurality of buttons 51-55 and 56*a*-56*e* may further include a plurality of m-bet buttons (m=1, 2, 3, 5, 10) (or bet×n buttons) 56*a*-56*e* that may be disposed at a lower stage of in a left area. The plurality of buttons 51-55 and 56*a*-56*e* may further include and a max bet button 55 and a start button (or repeat button) 54 that may be disposed right to the m-bet buttons 56*a*-56*e*. The coin entry 41 and the bill entry 43 may be disposed upper to the max bet button 55 and the start button 54.

The reserve button 51 may be an operating button to be used when a player wants to leave a seat or when a player wants to request the staffs in a gaming facility to exchange money. The take win button 52 may be a cash-out button used to add the credit data relating to credits obtained in a variety of games to the credit data that is stored in the smart card or output the bill or the ticket corresponding to the total credits. The help button 53 may be a button to be used when a user does not clearly understand how to play a game or the like, and when the help button 53 is pressed, a variety of help information including game rules may be displayed on the primary display 20.

The 1-bet button 56*a* may be used when player's current credits are betted on a one-by-one basis for each winning payline every time the button is pressed. In this embodiment, an amount of 1 BET may correspond to 50 credits such that all the fifty paylines P1-P50 are selected. The m-bet button (m>1) 56*b*-56*e* may be a button for starting a game in m BETs for each winning payline. Therefore, a bet amount to for winning paylines may be determined by pressing any one of the m-bet button 56*a*-56*e*. If the player bets N BETs by pressing the N-bet button 56*b*-56*e*, default credits (for example 50 credits) of the winning paylines may be multiplied by N such that the multiplied credits are awarded to the player. Furthermore, the player can bet (N+M) BETs by pressing the N-bet button 56*b*-56*e* and the M-bet button 56*b*-56*e* in sequence. At this time, the slot machine 680 may restrict an upper limit of the bet amount.

The max bet button 55 may be an operating button to be used when a maximum amount are betted.

The spin button 54 may be an operating button to be used when scrolling symbols in a game and when starting a rotation of a selection wheel in a bonus game.

The coin entry 41 may be configured to accept the coin in the cabinet 11. The bill entry 43 may be configured to validate whether the entered bill is legitimate or not and to accept a legitimate bill in the cabinet 11. Moreover, the bill entry 43 may accept the ticket having the barcode.

The slot machine 680 may further include an integrated circuit (IC) card reader 62 disposed below the primary display 20. The IC card reader 62 receives an IC card which stores information of player identification and game log related with the games previously played by the player, for example. In addition, the IC card may store data equivalent to coins, bills, or credits owned by the player. The IC card reader 62 reads and writes data from and to the inserted IC card. The IC card reader 62 may include an LCD for displaying the data read from the IC card.

The slot machine 680 further include a speaker 7 for outputting sound effects and a lamp 18 for light flashing.

Electronic Configuration of Slot Machine

Next, a configuration of a circuit included in a slot machine 680 will be described with reference to FIG. 18.

Figure 18:
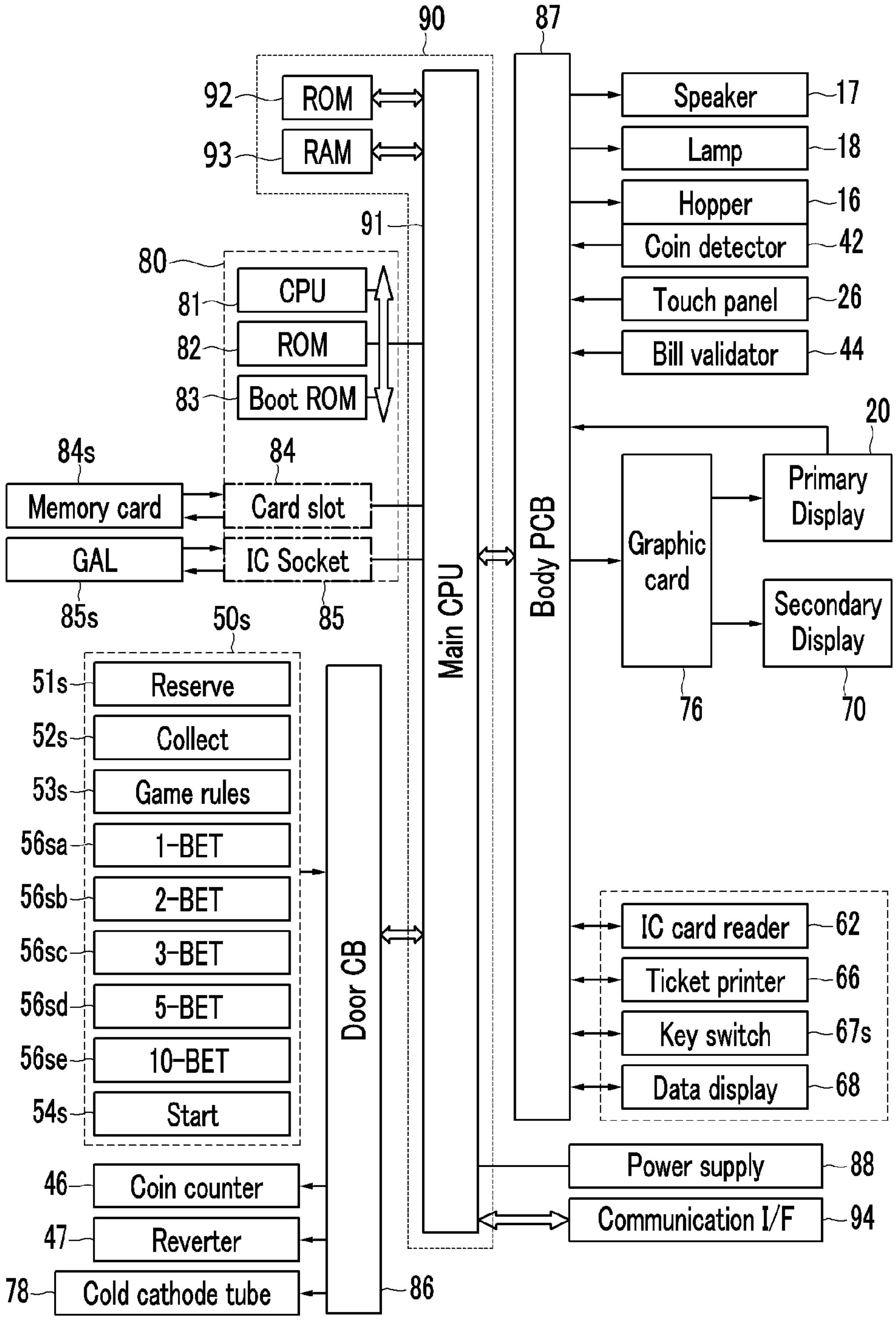
FIG. 18 is an electrical block diagram of the slot machine according to an embodiment of the present invention.

FIG. 18 is an electrical block diagram of the slot machine according to an embodiment of the present invention.

Referring to FIG. 18, the slot machine 180 includes a gaming board 80, a motherboard 90, and a door PCB 86, and a body PCB 87.

A gaming board 80 includes a CPU 81, a ROM 82 accessible by the CPU 81 through an internal bus, and a boot ROM 83 accessible by the CPU 81 by an internal bus. The gaming board 80 additionally includes a card slot 84 which can receive and communicate with a memory card 84*s*, and an IC socket 85 provided correspondingly to a Generic Array Logic (GAL) 85*s*.

The memory card 84*s* may include a non-volatile memory and may store a game program and a game system program.

The card slot 84 is configured to receive and eject the memory card 84*s*, and is connected to a motherboard 90 by an IDE bus. The details of the game performed in the slot machine 1 may be changed by replacing the memory card 84*s* with another one, or by withdrawing the memory card 84*s* from card slot 84, writing another program into the memory card 84*s*, and then inserting the memory card 84*s* into the card slot 84 again.

The GAL 85*s*, which is a type of a Programmable Logic Device (PLD) having a fixed OR array structure, has a plurality of input ports and output ports. When the GAL 85*s* receives certain data through the input ports, it outputs data corresponding to the input data through the output ports.

The IC socket 85 is configured in such a manner that the GAL 85*s* can be inserted into the IC socket 85 or detached from the IC socket 85, and connected to a motherboard 90 by a PCI bus.

The CPU 81, the ROM 82, and the boot ROM 83 interconnected by the internal bus are connected to the motherboard 90 by the PCI bus. The PCI bus enables signal transmission between the motherboard 90 and the gaming board 80, and supply of power from the motherboard 90 to the gaming board 80.

The ROM 82 stores an authentication program. The boot ROM 83 stores a preliminary authentication program, a boot code to be used by the CPU 81 for activating the preliminary authentication program, and the like. The authentication program is a tamper check program for authenticating the originality of the game program and the game system program. The preliminary authentication program is a program for authenticating the originality of the authentication program. The authentication program and the preliminary authentication program are written in a sequence of proving that the subject program has not been tampered.

The motherboard 90, which may be implemented using a commonly available general main board, executes the game program and the game system program. The motherboard 90 includes a main CPU 91, a ROM 92, a RAM 93, and a communication interface 94.

The ROM 92, which may be a flash memory, may be configured to store a program to be executed by the main CPU 91 such as BIOS, along with another data to be maintained permanently. When being executed by the main CPU 91, the BIOS performs initialization of peripheral devices. Also, the BIOS starts to load the game program and the game system program stored in the memory card 54 through the gaming board 80. The ROM 92 may be rewritable. However, write-protected one might be used as the ROM 92 as well.

The RAM 93 stores data and programs which are used during the operation of the main CPU 91. For example, when the game program, the game system program, or the authentication program is to be loaded, the RAM 93 can store such programs. Also, the RAM 93 is provided with working space for the execution of the programs. Examples of the space include a space for storing the number of bets, the payout amount, the credit amount, and the like can be maintained during the execution of the game. Also, plurality of tables defining symbols, symbol codes, winning combinations, and their probabilities are maintained during the execution of the game. Further, the RAM 93 stores symbol code determination tables which stores mapping information between symbol codes and random number which can used for determining symbols based on random numbers. In particular, the RAM 93 maintains a mode flag indicating the gaming mode, along with a game and a game counter of which count value indicates the number of executed chance mode games or the number of possibly remaining chance mode games.

Also, the RAM 93 stores count values of a plurality of counters, which include a bet counter, a payout amount counter, a credit amount counter, and a chance mode game counter which counts the number of chance mode games. Alternatively, however, some of the count values can be maintained in an internal register of the main CPU 91.

The communication interface 94 facilitates data communication of the main CPU 91 with an external controller of, for example, a server through a communication channel.

Besides, the motherboard 90 is connected to the door PCB 86 and the body PCB 87 by USB communications. The motherboard 90 is also connected to a power supply 88. The main CPU 91 of the motherboard 90 boots up and operates using the power supplied from the power supply 88, and passes over some of the power to the gaming board 80 through the PCI bus so as to boot up the CPU 81. The door PCB 86 and the body PCB 87 are connected to input devices such as a switch and a sensor, and peripheral devices of which operation are controlled by the main CPU 91. Also, the door PCB 86 is connected with a control panel 40, a coin counter 46, a reverter 47, and a cold cathode tube 78.

The control panel 40 has a reserve switch 51*s*, a collect switch 52*s*, a game rule switch 53*s*, a start switch 54*s*, a 1-BET switch 56 as, a 2-BET switch 56*bs*, a 3-BET switch 56*cs*, a 5-BET switch 56*ds*, and a 10-BET switch 56*es*, each of which is provided correspondingly to respective buttons 51 to 54 and 56*a* to 56*e*. The switches 51*s* to 54*s* and 56 as to 56*es* detects pressing of the respective buttons 51 to 54 and 56*a* to 56*e* to output signals to the main CPU 91.

The coin counter 46 and the reverter 47 are disposed in the coin entry 41. The coin counter 46 validates legitimacy of coins inserted into the coin entry 41 in terms of material, shape, or the like. The coin counter 46 outputs a signal to the main CPU 91 when detecting a legitimate coin. Meanwhile, illegitimate coins are discharged to the coin tray 15. The reverter 47, which operates based upon a control signal from the main CPU 91, distributes the legitimate coins validated by the coin counter 46 into either a hopper 16 or a cash box (not shown in the drawing). The coins are guided into the hopper 16 when the hopper 16 is not filled with coins. Contrarily, however, the coins are guided into the cash box when the hopper 16 is filled with coins.

The cold cathode tube 78, which is disposed on the rear face of the secondary display 70, functions as a backlight and illuminates based on a control signal from the main CPU 91.

The body PCB 87 is connected with the speaker 17, the lamp 18, the hopper 16, a coin detector 42, the touch panel 26, a bill validator 44, the reel assembly 30, the IC card reader 62, a graphic card 76, the ticket printer 66, a key switch 67*s*, and the data display 68.

The lamp 18 flashes based upon a control signal from the main CPU 91. The speaker 17 outputs a sound such as BGM based upon the control signal from the main CPU 91.

The hopper 16, which operates based upon a control signal from the main CPU 91, pays out coins of the designated payout amount to the coin tray 15 through a coin payout exit formed between the belly glass 14 and the coin tray 15. The coin detector 42 detects coins paid out from the hopper 16 to output a detection signal to the main CPU 91.

The touch panel 26 detects a position touched by the player to provide the main CPU 91 with a position sense signal corresponding to the detected position. The bill validator 44 in the bill entry 43 provides, upon detection of a legitimate bill, the main CPU 91 with a bill detection signal corresponding to the bill amount.

The graphic card 76 controls a primary display 20 and a secondary display 70 in response to a control signal from the main CPU 91. The graphic card 76 may include a Video Display Processor (VDP) generating video data, and a video RAM temporarily storing the video data. The video data may be originated from the game program stored in the RAM 93.

The IC card reader 62 reads out data stored in the IC card inserted into the card slot 176 to provide the read-out data to the main CPU 91. Also, the IC card reader 62 writes data received the main CPU 91 into the ID card.

The ticket printer 66 prints on a ticket the barcode containing information of the credit amount stored in the RAM 93, date and time, the identification number of the slot machine 1, and the like, in response to the control signal from the main CPU 91 to output the barcode imprinted ticket.

The key switch 67*s*, which is disposed behind the keypad 67, outputs a key detection signal to the main CPU 91 when the keypad 67 is pressed by the player.

The data display 68 displays information related the input through the keypad 67 in response to a control signal from the main CPU 91.

Screen Images

During the execution of the normal round and the free round, the slot machine 680 displays a variety of images and actions on the displays 20 and 70, embodiments of which is described in detail with reference to FIG. 19 to FIG. 32.

First, a screen of the primary display 20 and a screen of the secondary display 70 are described in detail with reference to FIG. 19, FIG. 20, and FIG. 21.

Figure 19:
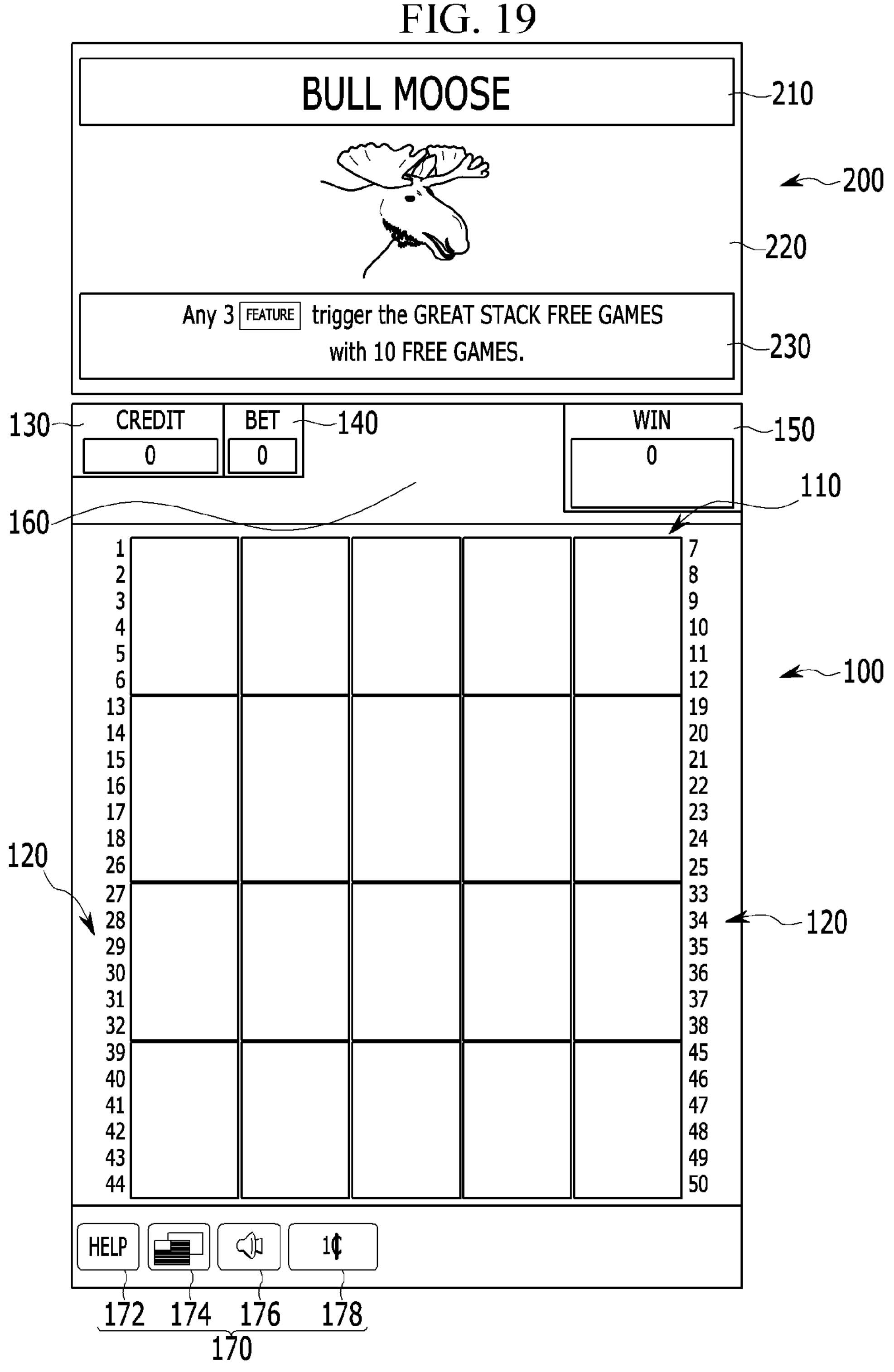
FIG. 19 is a screen image shown on the primary display and the secondary display in a normal round of a game according to an embodiment of the present invention.
Figure 20:
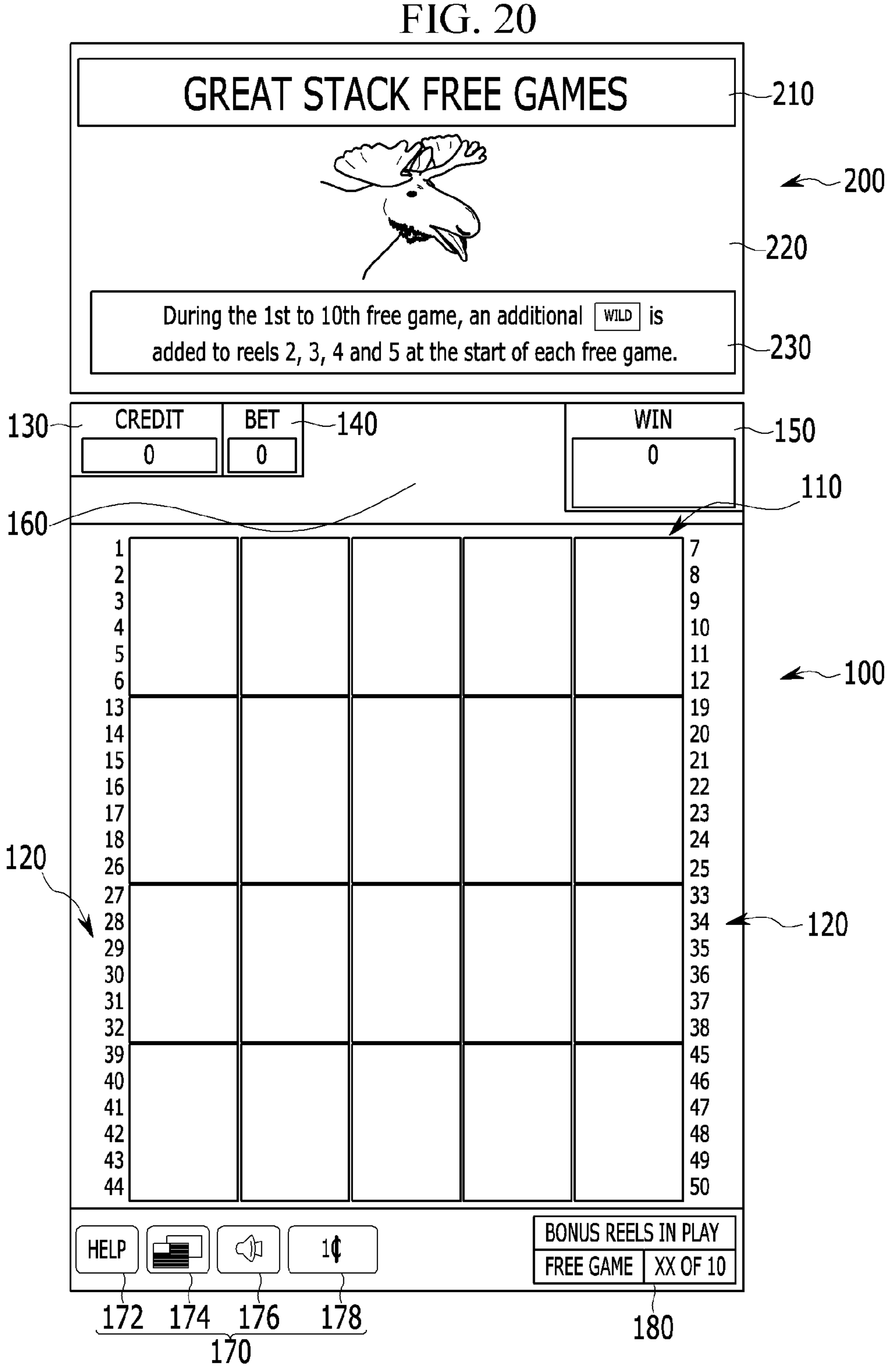
FIG. 20 is a screen image shown on the primary display and the secondary display in a free round of the game according to an embodiment of the present invention.
Figure 21:
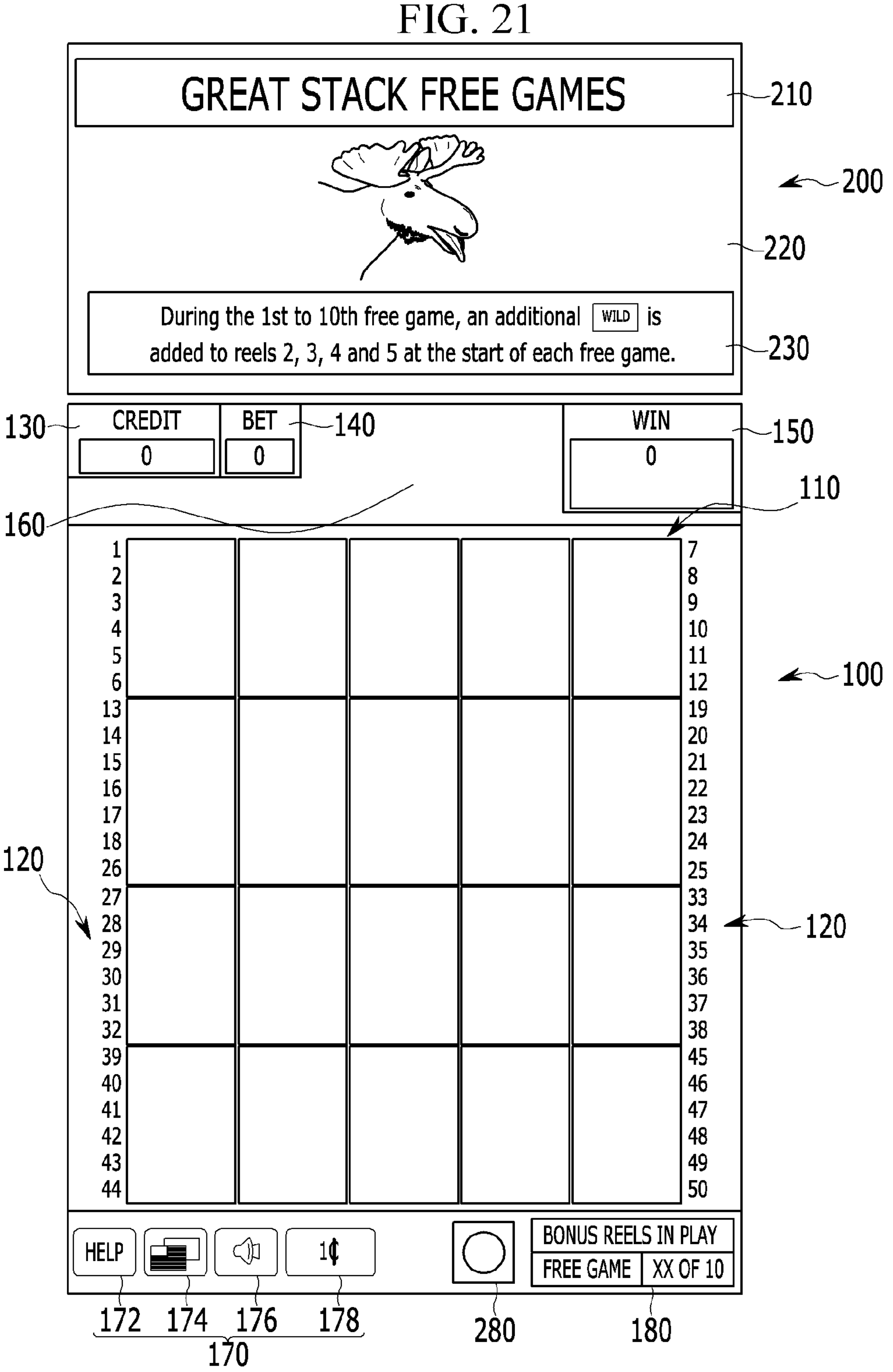
FIG. 21 is a screen image shown on the primary display and the secondary display in a first-type free round of the game after retrigger of a free mode according to an embodiment of the present invention.

FIG. 19 is a screen image shown on the primary display and the secondary display in a normal round of a game according to an embodiment of the present invention, FIG. 20 is a screen image shown on the primary display and the secondary display in a free round of the game according to an embodiment of the present invention, and FIG. 21 is a screen image shown on the primary display and the secondary display in a first-type free round of the game after retrigger of a free mode according to an embodiment of the present invention.

Referring to FIG. 19, a screen 100 of the primary display 20 in a normal mode includes a symbol display area 110, a pair of payline areas 120, a credit meter 130, a bet meter 140, a win meter 150, a message area 160, and a button area 170.

The symbol display area 110 is disposed at a center of the screen 100. A set of symbols used in a game includes first to fifth symbol strips SS1-SS5 as shown in FIG. 6 to FIG. 9, and four successive symbols selected in each symbol strip SS1-SS5 form a symbol arrangement of a 4×5 matrix including four rows and five columns.

The symbol set includes five picture symbols SB1 of a moose, a bear, a wolf, a beaver, and a woodpecker, six character symbols SB2 of "9," "10," "J," "Q," "K," and "A," a feature symbol SB31, and a wild symbol SB32 as shown in FIG. 1. The feature symbol SB32 serves as a scatter symbol, and the moose symbol S11 serves as a top symbol.

The first to third symbol strips SS1-SS3 may include all symbols, while the fourth and fifth symbol strips SS4 and SS5 may include all symbols except for the feature symbol SB31. When each of the first to third symbol strips SS1-SS3 in a symbol arrangement for a game round includes the feature symbols SB31, a player wins the game round regardless of the positions of the feature symbols SB31. A minimum number of the same symbols required for a winning combination is two for the top symbol SB11 and three for other symbols. For example, two top symbols SB11 aligned from the first symbol strip SS1 along any payline form a winning combination. However, two of the same symbols other than the top symbol SB11 arranged in sequence from the first symbol strip SS1 along a payline may not form a winning combination although three or more of the same symbols in such a position may form a winning combination. The prize for a winning combination with the top symbols may be the highest compared with that with the other symbols.

The pair of payline areas 220 are disposed left and right to the symbol display area 110. The payline areas 220 show the serial numbers of paylines, and FIG. 19 shows fifty paylines from 1 to 50, for example. A player may not be allowed to select part of the paylines, and all the paylines may be always activated.

The credit meter 130 denoted by "CREDIT" is disposed near an upper left corner of the screen 100. The credit meter 130 may show remaining credits, and an initial value of the credit meter 130 may be zero. The number in the credit meter 130 may decrease by a bet amount during an execution of a game round, and may increase when a player presses the collect button 52 after winning a game round.

The bet meter 140 denoted by "BET" is disposed right to the credit meter 130. The bet meter 140 may show either a total bet amount of a current game round or a total bet amount of a last game round. The total bet amount displayed in the bet meter 140 may be equal to a bet amount multiplied by a number of selected paylines.

The win meter 150 denoted by "WIN" is disposed near an upper right corner of the screen 100. The win meter 150 may show a total amount of credits obtained by a win or wins in a game round, and may further show details of the wins awarded in the game round. According to an embodiment of the present invention, the win meter 150 includes a first line showing a total amount of win credits and a second line showing details of each win awarded in the game. The details of a win may include a payline number related to the win and an amount of credits obtained by the win.

The message area 160 is disposed between the bet meter 140 and the win meter 150. The message area 160 may show bet information in a current game round and a current status of the slot machine. For example, when a game round is being executed, the message area 160 may show a message informing of a bet amount per a payline, and examples of such messages are "1 CREDIT PER LINE" or "2 CREDITS PER LINE." When waiting for a game round, the message area 160 may show a corresponding message, for example, "PLAY ON, GAMBLE or TAKE WIN." A massage, for example, "GAME OVER" may be shown in the message area 160 when a game is finished and the slot machine 1 is in an idle state.

The button area 170 is disposed near a lower left portion of the screen 100. The button area 170 includes a help button 172, a language change button 174, a volume control button 176, and a denomination box 178. The help button 172, the language change button 174, and the volume control button 176 may be touch buttons that can be touched by a player to cause corresponding changes.

The help button 172 denoted by "HELP" is disposed near a lower left corner of the screen 100. The help button 172, when touched, may trigger a help screen (not shown). The help button 172 may darken to be disabled under some circumstances, for example, when the symbols are scrolling.

The language change button 174 denoted by two partly overlapping flags is disposed right to the help button 172. The language change button 174 may cause switch between different languages when it is touched. For example, the language change button 174 may show two national flags corresponding to languages so that one of the two national flags may be placed in front of the other of the two national flags. A first language corresponding to a front national flag may be currently being used in the slot machine 1, and a second language corresponding to a rear national flag may not be currently used. When the language change button 174 is touched, the front national flag and the rear national flag may exchange their positions, and a currently used language may be changed into the second language. The help button 172 may darken to be disabled under some circumstances, for example, when the symbols are scrolling.

The volume control button 176 denoted by a picture of a speaker is disposed right to the language change button 174. The volume control button 176 may change a volume of a sound when it is touched. According to an embodiment of the present invention, the volume may be changed in turn among three levels, for example, a weak level, an intermediate level, and a strong level.

The denomination box 178 denoted by "1¢" is disposed right to the volume control button 176. The denomination box 178 may indicate a current denomination, and for example, FIG. 19 shows that a current denomination is a cent. The denomination shown in the denomination box 178 may be fixed to the slot machine 1, and may not be allowed to be changed.

A screen 200 of the secondary display 70 in a normal round includes a game title area 210, an image area 220, and an information area 230.

The game title area 210 is disposed on an upper portion of the screen 200. The game title area 210 may show a game title, for example, "BULL MOOSE."

The image area 220 is disposed on a center portion of the screen 200. The image area 220 may show an image related to a game, for example, a picture of a moose.

The information area 230 is disposed on a lower portion of the screen 200. The information area 230 may display a brief message related to the game, for example, a game rule. FIG. 19 shows a message "Any 3 FEATURE trigger the GREAT STACK FREE GAMES with 10 FREE GAMES." Other examples of the message in the normal round may be "During the 1st to 10th free game, an additional WILD is added to reels 2, 3, 4 and 5 at the start of each free game" and "PLAY 1 TO 50 CREDITS." These messages may be displayed in turn at a predetermined time interval, for example, about ten minutes.

Referring to FIG. 20, the screen 100 of the primary display 20 in a free round includes a free game counter 180 as well as the symbol display area 110, the payline areas 120, the credit meter 130, the bet meter 140, the win meter 150, the message area 160, and the button area 170.

The free game counter 180 is disposed near a lower right corner of the screen 100. The free game counter 180 may include three boxes, for example, an upper box, a lower left box, and a lower right box. The upper box is denoted by "BONUS REELS IN PLAY" in order to inform of executing a free round. The free game counter 180 may show a total number of free rounds and a number of remaining free rounds in a form of "XX OF 10" in the lower right box right to the lower left box denoted by "FREE GAME."

A screen 200 of the secondary display 70 in a free round includes a game title area 210, an image area 220, and an information area 230 like in the normal round. However, the game title are 210 may show a name of the free rounds, for example, "GREAT STACK FREE GAMES." A background of the image area 220 may be filled with another image or another color different from the image or the color in the normal round. Examples of messages in the information area 230 in a first-type free round may include "During the 1st to 10th free game, an additional WILD is added to reels 2, 3, 4 and 5 at the start of each free game" and "Any 3 FEATURE trigger the GREAT STACK FREE GAMES again only once during the feature with 5 FREE GAMES." An example of messages in the information area 230 in a second-type free round may include "During the 11 th to 15th free game, 4 additional 'MOOSE' are added to reel 1 at the start of each free game."

Referring to FIG. 21, the screen 100 of the primary display 20 in a first-type free round after retrigger of a free mode includes a retrigger icon 190 as well as the symbol display area 110, the payline areas 120, the credit meter 130, the bet meter 140, the win meter 150, the message area 160, the button area 170, and the free game counter 180.

The retrigger icon 190 is disposed left to the free game counter 180 in order to inform of the retrigger of a free mode.

A screen 200 of the secondary display 70 in a first-type free round after retrigger of a free mode includes a game title area 210, an image area 220, and an information area 230 like in the first-type free normal round.

Win Rendering

Next, a screen rendering for wins in a normal round according to an embodiment of the present invention is described with reference to FIG. 22A to FIG. 26.

Figure 22A:
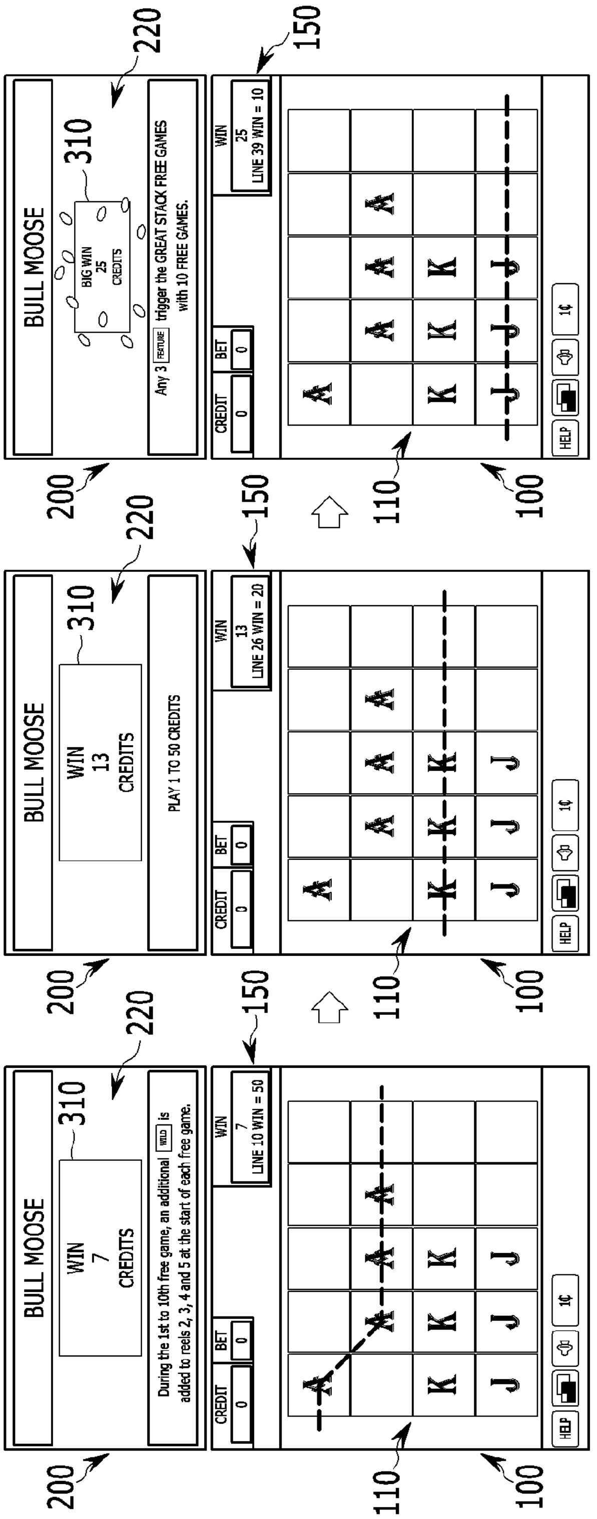
FIGS. 22A and 22B are schematic screen images that illustrate a screen rendering for wins in a normal round according to an embodiment of the present invention.
Figure 22B:
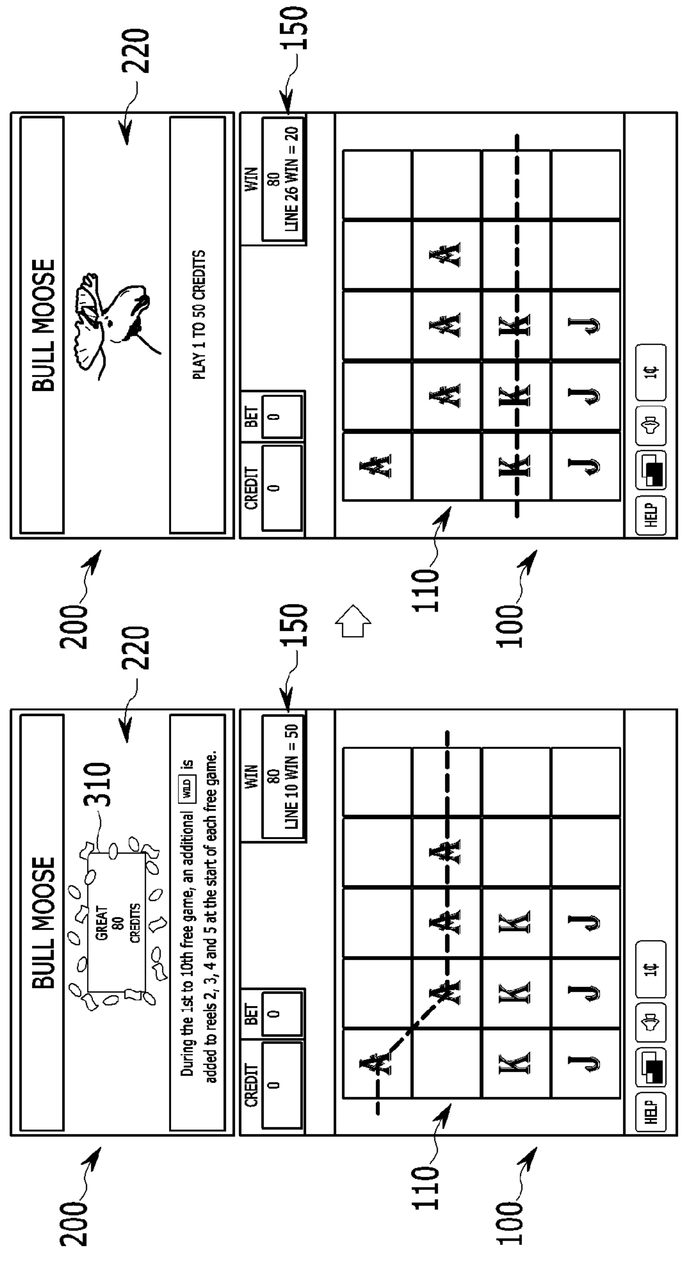
Figure 23:
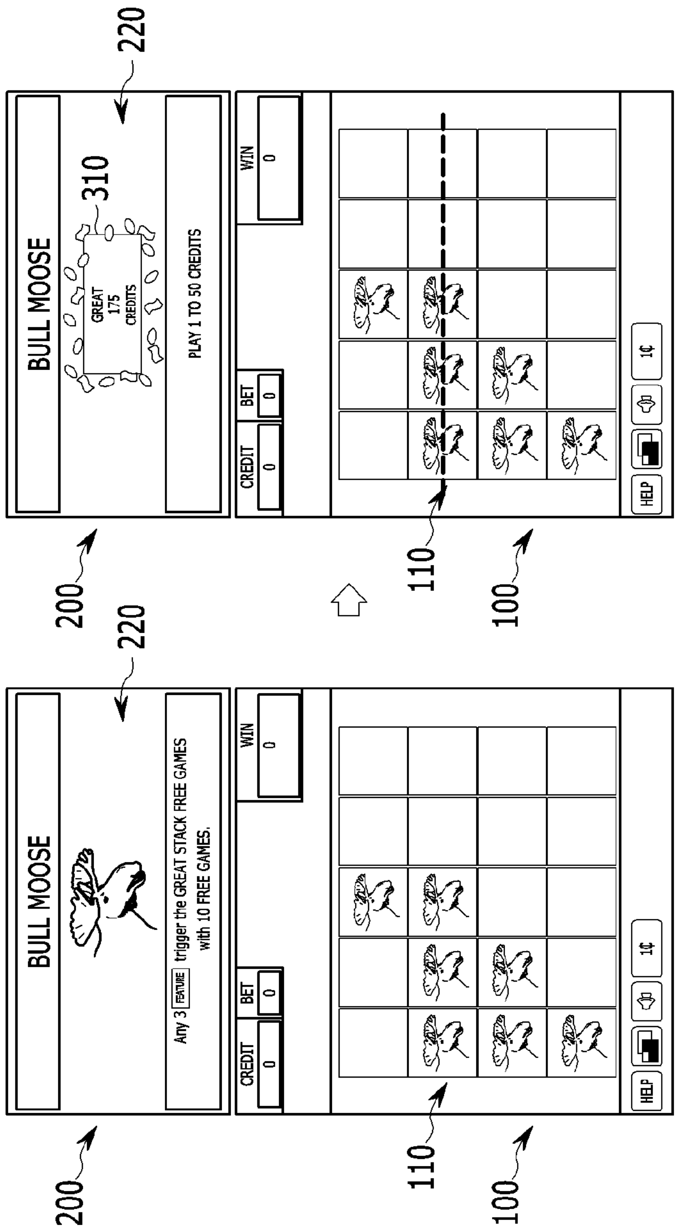
FIG. 23 is a schematic screen image that illustrate a screen rendering for wins including a top symbol win in a normal round according to an embodiment of the present invention.
Figure 24:
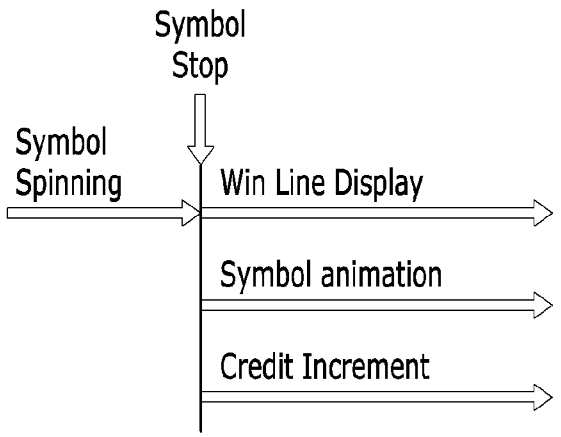
FIG. 24 to FIG. 26 are timing diagrams for win rendering.
Figure 25:
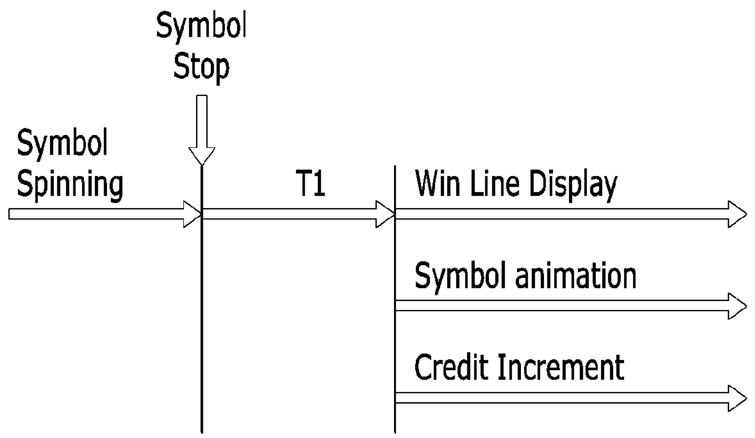
Figure 26:
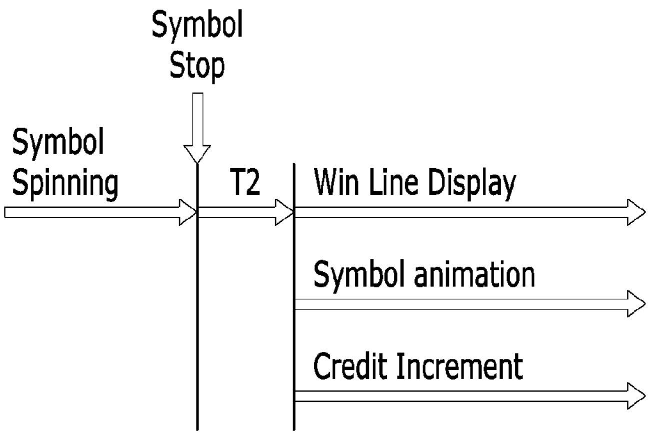

FIGS. 22A and 22B are schematic screen images that illustrate a screen rendering for wins in a normal round according to an embodiment of the present invention, FIG. 23 is a schematic screen images that illustrate a screen rendering for wins including a top symbol win in a normal round according to an embodiment of the present invention, and FIG. 24, FIG. 25, and FIG. 26 are timing diagrams for win rendering.

When a player wins a normal round, a screen rendering is performed after all the symbols stop. A win rendering for ordinary wins may include a win line display, a symbol animation, and a win credit increment. The win rendering may further include sound effect.

Referring to FIGS. 22A and 22B, information about wins obtained in the game round is displayed in sequence on the screens 100 and 200 of the displays 20 and 70. According to an embodiment of the present invention, information about a scatter win, if any, may be displayed first, and then information about line wins may be displayed. The information display for the line wins may proceed from the lowest payline number to the highest payline number.

According to an embodiment of the present invention, information about a win may be displayed by means of making the symbols and/or a payline related to the win flicker in the symbol area 110 and making the win meter 150 show a message informing of a type of the win, the number of the corresponding payline, and the credits earned by the win.

For example, the first screen shot shown in FIG. 22A shows a line win associated with a payline P10 shown in FIG. 16A. The symbol area 210 shows the payline P10 and corresponding four character symbols denoted by "A," which are flickering. At the same time, the win meter 150 shows a message "LINE 10 WIN=50" which indicates that the win is a line win associated with the payline P10 and the fifty credits are earned by the line win.

Furthermore, the win meter 150 may further show a total amount of earned credits by the wins in the game round in an incremental manner. The first screen shot in FIG. 22A shows that the win meter 150 shows "7" in the first line, which is increasing now but will reach a total amount of earned credits at last. A time schedule for incrementing credits may vary depending on the total amount of the earned credits.

On the image area 220 of the secondary screen 200, a win plate 310 is shown. The win plate 310 shows a message "WIN" and a total amount of earned credits in an incremental manner like the win meter 150. The number shown in the win plate 310 may be in synchronization with the number in the first line the win meter 150. The message and the image of the win plate 310 may be changed based on the earned credits compared with bet credits. For example, the background color of the win plate 310 may be silver when the credits are less than twenty times bet credits, and may be gold when the credits are equal to or greater than twenty times bet credits. When the credits are equal to or greater than twenty times bet credits, the message may be changed into "BIG WIN," and the image may include dropping coins as shown in the third screen shot of FIG. 22A. The message may be further changed into "GREAT," and the image may further include dropping bills as well as coins as shown in the first screen shot of FIG. 22B when the credits are equal to or greater than fifty times bet credits.

The wins shown in FIG. 22A and FIG. 22B are line wins associated with the paylines P10, P26 and P39 that award 50, 20, and 10 credits, respectively, and are shown in the first, second, and third screen shots of FIG. 22A, respectively. The numbers shown in the win plate 310 and the win meter 150 increases to reach eighty which is the sum of the earned credits as shown in the first shot of FIG. 22B.

When the increment of the total amount of earned credits is finished, the sequence of the flickering of the symbols and/or the paylines may be repeated once as shown in the first shot of FIG. 22B. Thereafter, the win plate 310 is removed although the flickering sequence of the symbols and/or the paylines may continue.

Some of the wins may accompany animations, and in this case, the animations may be maintained during the win rendering irrelevant of the flickering sequence.

Referring to FIG. 23, when the wins in a normal round include a line win associated with at least three top symbols (referred to a "top symbol win" hereinafter), the win rendering may include a special step for informing of the top symbol win. Although two top symbols may form a winning combination, the top symbol win may exclude that case.

Referring to FIG. 24, the win line display, the symbol animation, and the win credit increment of an ordinary win rendering may start simultaneously immediately after the spinning of the symbol strips stops.

Referring to FIG. 23 and FIG. 25, the win line display, the symbol animation, and the win credit increment of a win rendering related to the top symbol win may be delayed for a predetermined time duration T1 after the spinning of the symbol strips SS1-SS5 stops. During the predetermined time T1, a sound effect such as a moose's crying may be provided.

Referring to FIG. 26, the win line display, the symbol animation, and the win credit increment of a big win may be also delayed for a predetermined time duration T2 after the spinning of the symbol strips SS1-SS5 stops. The big win may indicate a case that the total credits earned by the win are equal to or greater than twenty times the bet credits. The predetermined time T2 may be about twenty frames, i.e., about ⅔ seconds, and no rendering effect may be provided during the predetermined time T2.

Free Mode Rendering

Next, screen images in a free mode are described with reference to FIG. 27 to FIG. 32.

Figure 27:
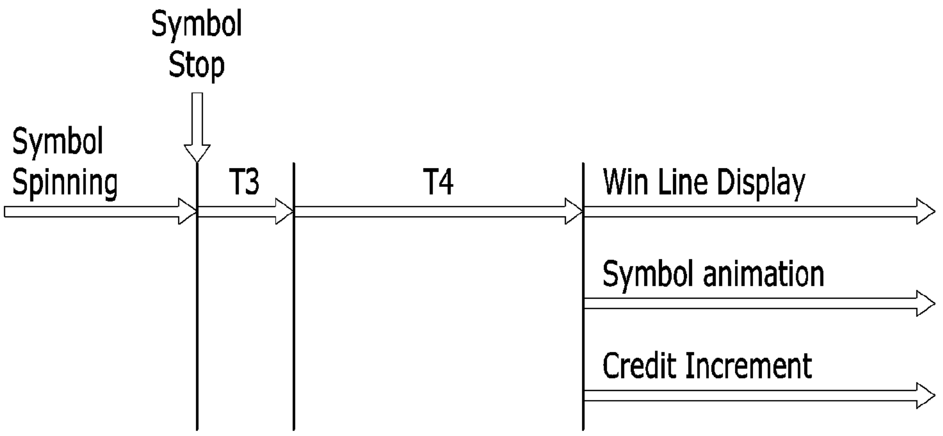
FIG. 27 is a timing diagram when triggering a free mode according to an embodiment of the present invention.

FIG. 27 is a timing diagram when triggering a free mode according to an embodiment of the present invention, and FIG. 28 to FIG. 32 are schematic screen images that illustrate a screen rendering for wins in a free mode round according to an embodiment of the present invention.

Trigger of Free Mode and First-type Free Round

A trigger of a free mode of a game is described with reference to FIG. 27, FIG. 28, and FIG. 29.

Figure 28:
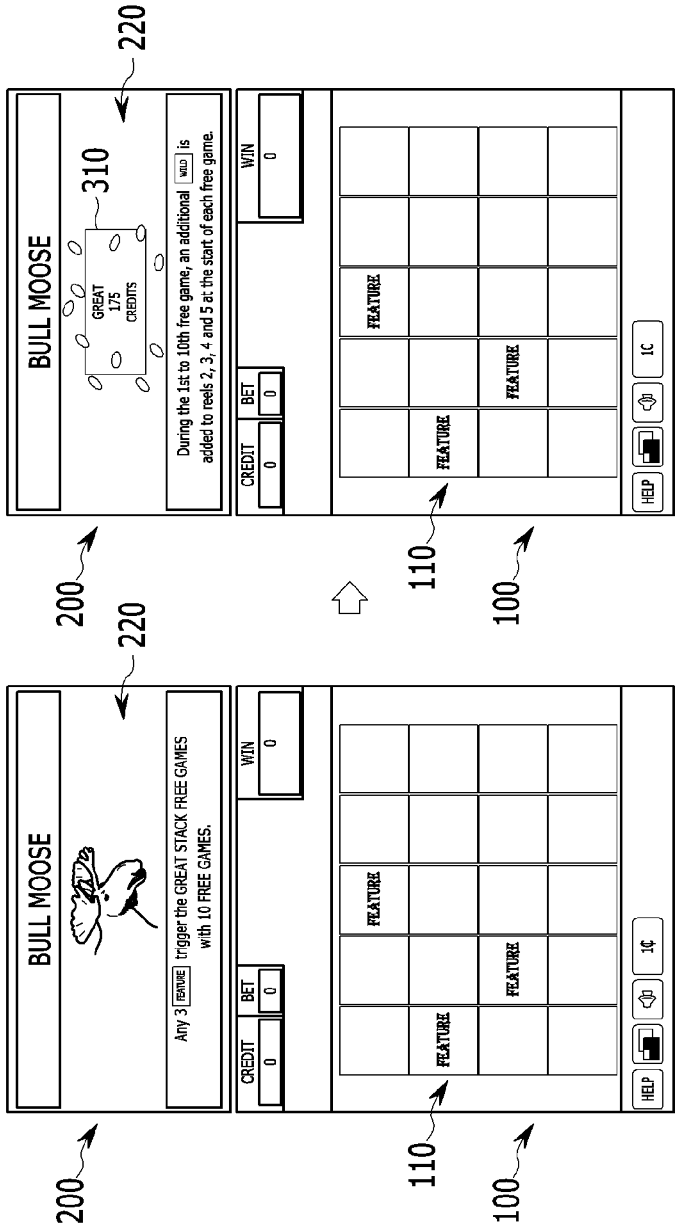
FIG. 28 to FIG. 32 are schematic screen images that illustrate a screen rendering for wins in a free mode round according to an embodiment of the present invention.
Figure 29:
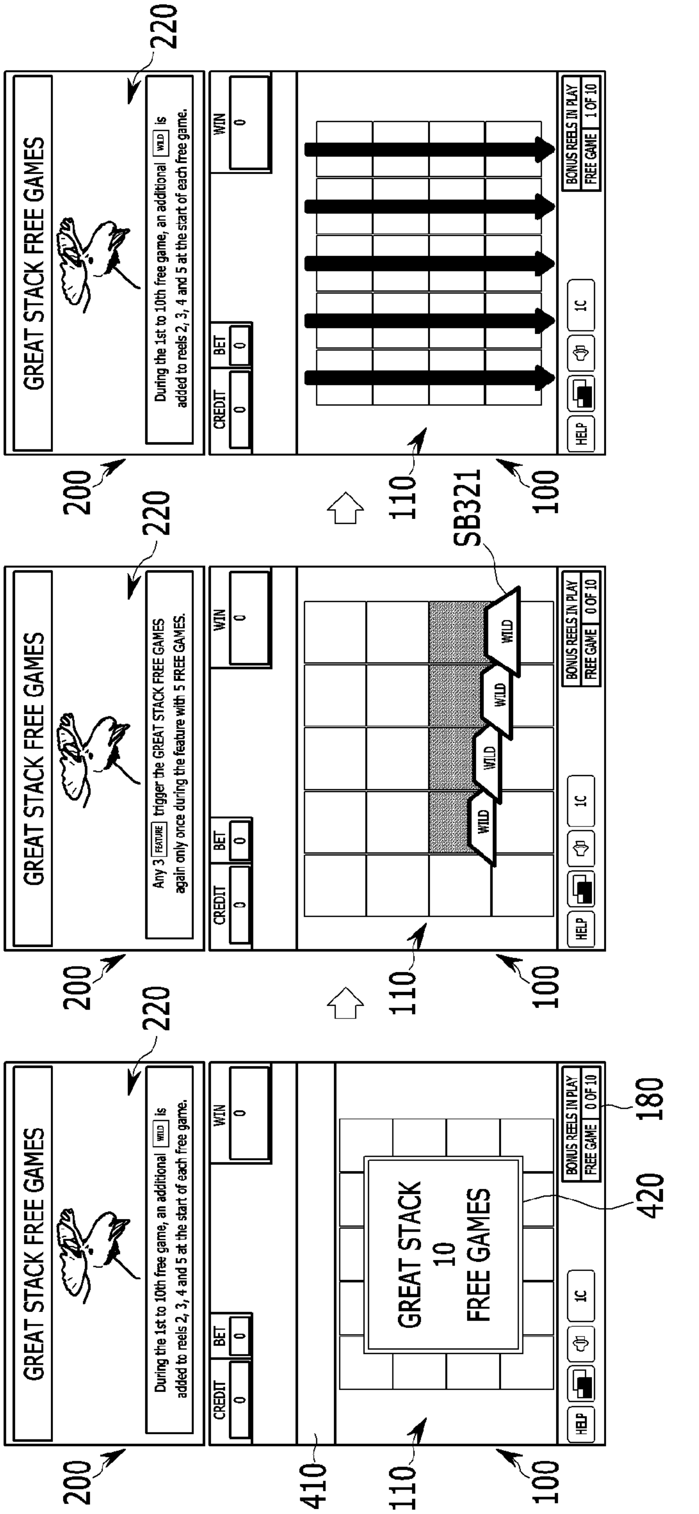

FIG. 27 is a timing diagram illustrating trigger of free rounds according to an embodiment of the present invention, and FIG. 28 and FIG. 29 are still screen images of the primary screen and the secondary screen showing the trigger of the free rounds.

Referring to FIG. 27, FIG. 28, and FIG. 29, when each of first to third symbol strips SS1-SS3 in a symbol arrangement in a normal round of a game includes a feature symbol SB31, a free mode is triggered.

Referring to FIG. 27 and FIG. 28, a sound effect informing of the appearance of the feature symbols SB31 is provided for a time duration T4 after a waiting time T3 from the stop of the symbol strips SS1-SS5. According to an embodiment of the present invention, the waiting time T3 may be about thirty frames, i.e., about one second, and the time duration T4 of the sound effect may be about three seconds. Thereafter, a win rendering related to a scatter win with the three feature symbols SB31 is performed as described above. The second screen shot of FIG. 28 shows the primary screen 100 and the secondary screen 200 after the win rendering is finished.

Referring to FIG. 29, the primary screen 100 and the secondary screen 200 are changed into those in the free rounds after the win plate 310 shown in FIG. 28 disappears. In addition, a message box 420 informing of the start of a free round is shown at the center of the primary screen 100 as shown in the first shot of FIG. 29. An example of a message in the message box 420 is "GREAT STACK FREE GAMES 10 FREE GAMES."

Thereafter, the primary screen 100 shows an image showing the insertion of four additional wild symbols SB321 into the second to fifth symbol strips as shown in the second screen shot of FIG. 29. Subsequently, a first-type free round is executed to have the symbol strips SS1-SS5 start to move or scroll.

End of Free Mode and First-type Free Round

Next, end of a free mode is described with reference to FIG. 30.

Figure 30:
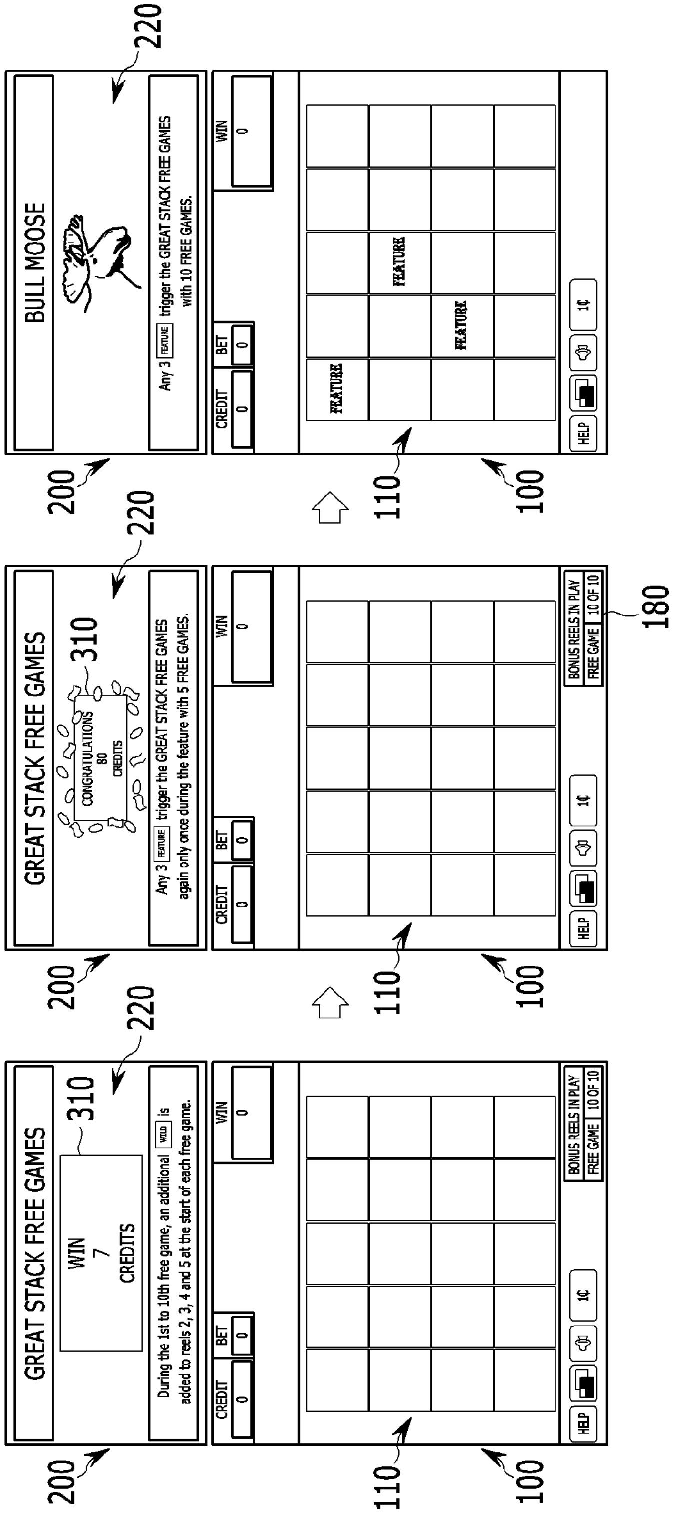

FIG. 30 is still screen images of the primary screen and the secondary screen showing an end of a free mode.

When a last first-type free round in a free mode is completed without retrigger, i.e., without having three feature symbols in the first to third symbol strips in any of the first-type free rounds, the free mode is finished.

Referring to FIG. 30, after a win rendering for the last first-type free round is completed as shown in the first screen shot, a win plate 310 informing of a total amount of earned credits during the free rounds is shown on the secondary screen 200 as shown in the second screen shot. The win plate 310 appearing when the free mode is finished has a top message "CONGRATULATIONS" different from that in individual free rounds and normal rounds. However, the win plate 310 may not be shown on the secondary screen 200 when there is no win in the free mode.

Referring to the third screen shot of FIG. 30, after the win plate 310 disappears, the primary screen 100 and the secondary screen 200 return to those when the free mode is triggered in the normal rounds.

Trigger of Second-type Free Round

A retrigger of the free mode or a trigger of a second-type free round is described with reference to FIG. 31A, FIG. 31B, and FIG. 32.

Figure 31A:
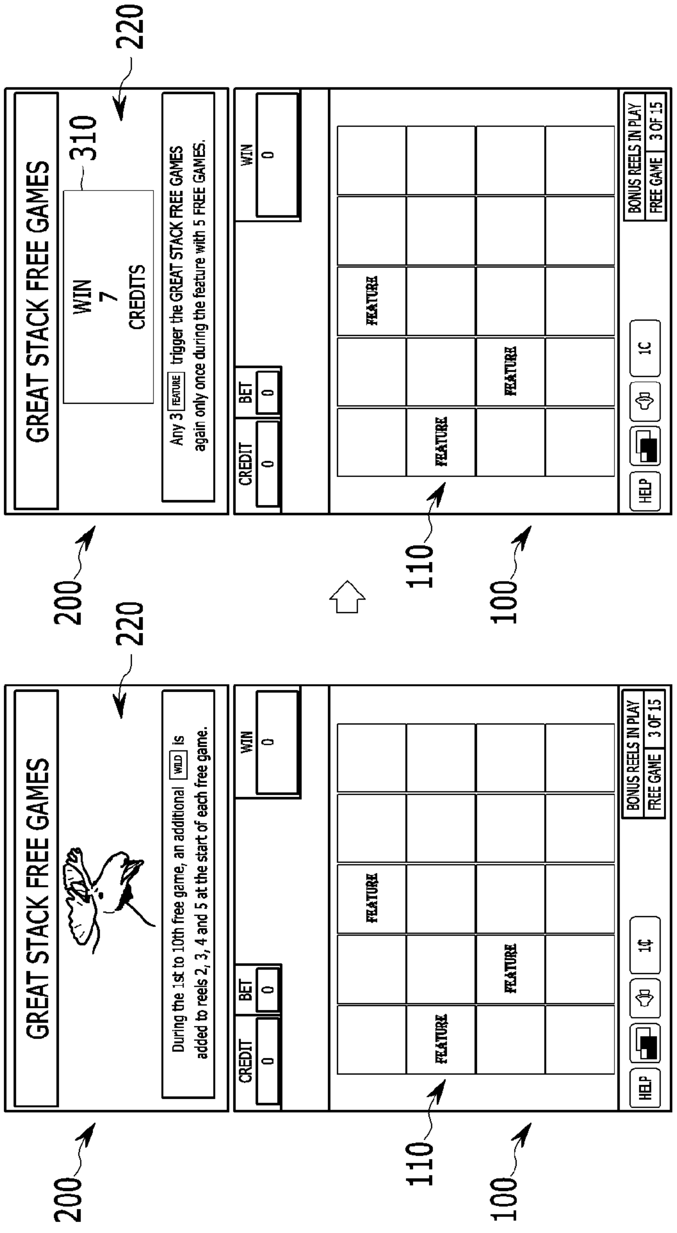
Figure 31B:
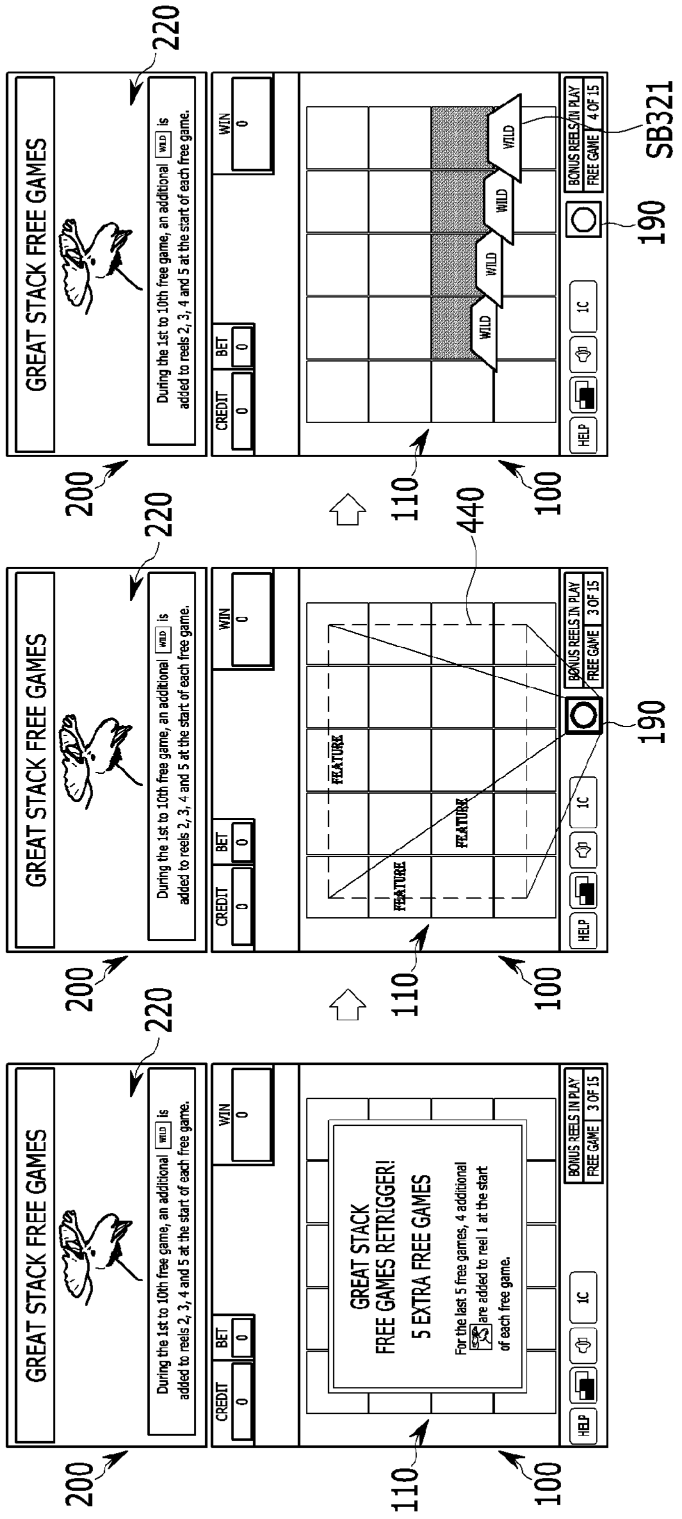

FIG. 31A and FIG. 31B is a still screen image of the primary screen and the secondary screen showing the retrigger of the free rounds.

Referring to FIG. 31A, when each of first to third symbol strips SS1-SS3 in a symbol arrangement in a first-type round of a game includes a feature symbol SB31 for the first time as shown in the first screen shot, a second-type free round is triggered after the execution of the first-type free round are completed. However, the screen images are changed immediately after the three feature symbols SB31 appear. When the appearance of the feature symbols in a first-type round is not the first time, a second-type free round is not triggered.

A sound effect informing of the appearance of the feature symbols SB31 is also provided for a time duration T4 after a waiting time T3 from the stop of the symbol strips SS1-SS5 as described above with reference to FIG. 27. However, the sound effect may be omitted when a previous first-type free round have already shown the feature symbols SB31.

Thereafter, a win rendering is also performed as shown in the second screen shot of FIG. 31A.

Referring to FIG. 31B, a message box 440 informing of the addition of second-type free rounds is shown at the center of the primary screen 100 as shown in the first shot after the win plate 310 shown in FIG. 31A disappears. An example of a message in the message box 420 is "GREAT STACK FREE GAMES RETRIGGER 5 EXTRA FREE GAMES For the last 5 free games, 4 additional 'MOOSE' are added to reel 1 at the start of each free game." In addition, the total number of free rounds in the free game counter 180 is changed from 10 to 15.

Thereafter, the message box 440 disappears and the retrigger icon 190 becomes shown left to the free game counter 180 as shown in the second screen shot of FIG. 31B. Thereafter, the primary screen 100 shows an image showing the insertion of four additional wild symbols SB321 into the second to fifth symbol strips and another first-type round is executed as shown in the last screen shot.

After the execution of the first-type free rounds is completed, a second-type free round is executed, which is described with reference to FIG. 32.

Figure 32:
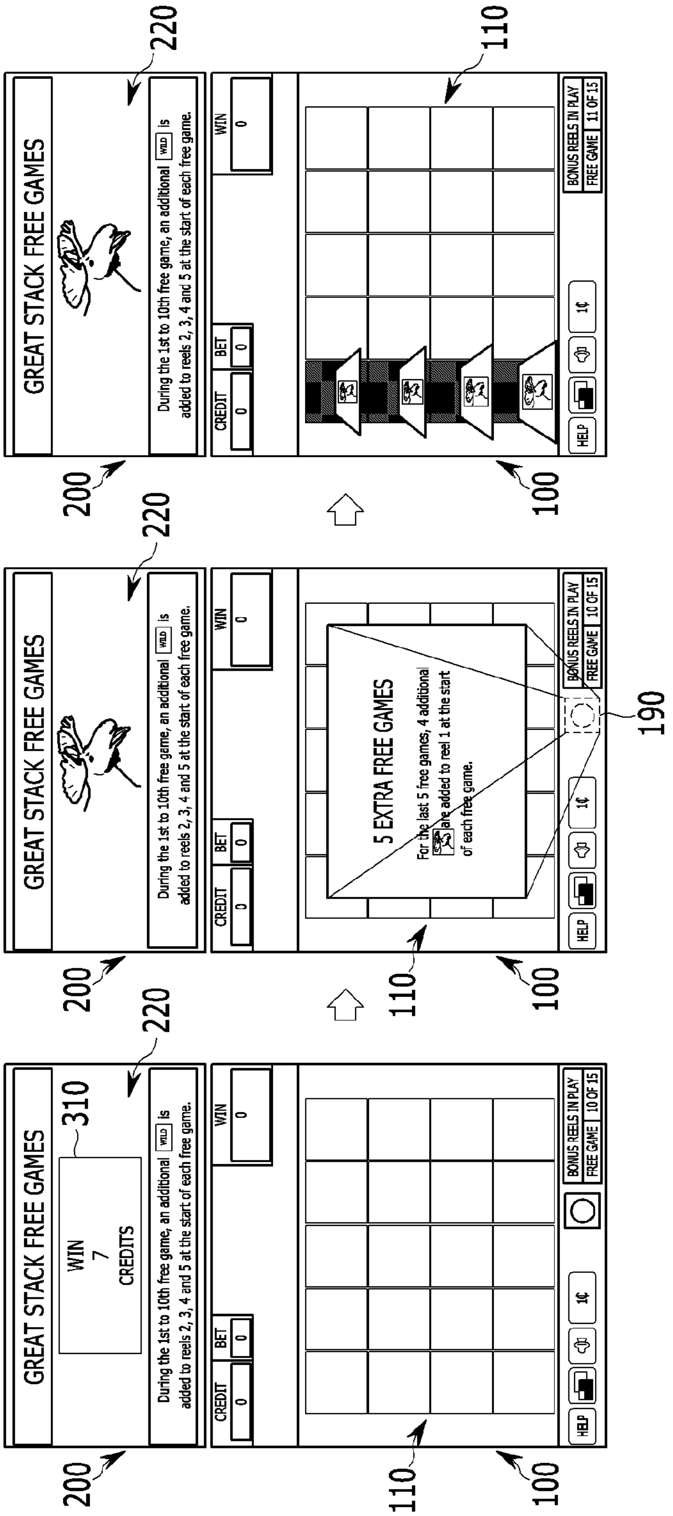

FIG. 32 is still screen images of the primary screen and the secondary screen showing the end of the first-type free rounds and the start of the second-type free rounds.

Referring to FIG. 32, a win plate 310 informing of earned credits in the last first-type free round is shown on the secondary screen 200 as shown in the first screen shot.

After the win plate 310 disappears, the retrigger icon 190 disappears and, instead, a message box informing of the start of second-type free rounds is shown at the center of the primary screen 100 as shown in the second shot of FIG. 32. An example of a message in the message box 420 is "5 EXTRA GAMES For the last 5 free games, 4 additional 'MOOSE' are added to reel 1 at the start of each free game."

Thereafter, the primary screen 100 shows an image showing the insertion of four additional top symbols SB111 into the first symbol strip SS1 as shown in the third screen shot. Subsequently, a second-type free round is executed to have the symbol strips SS1-SS5 start to move or scroll.

Embodiments of the present invention can also be embodied as a computer readable program on a computer-readable recording medium. The computer readable recording medium is any data storage device that can store data that can be read thereafter by a computer. Examples of the computer readable recording medium include ROMs, RAMs, CD-ROMs, magnetic tapes, floppy disks, and optical data storage devices. The computer readable recording medium can also be distributed over a network coupled computer system so that the computer readable code is stored and executed in a distributed fashion.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A gaming machine comprising:

a display device configured to display arrangements of symbols, each arrangement of the symbols selected from a set of symbols;

a memory configured to store a plurality of tables defining the set of symbols, symbol codes for the set of symbols, winning combinations of the set of symbols, probabilities of the winning combinations, and mapping information between the symbol codes and random numbers;

an item entry by which value to be bet can be added to the gaming machine;

a validator;

a payout mechanism configured to pay out gaming media; and a controller configured to control the display device, to identify gaming media that has been added to the gaming machine, via the validator, to establish a credit balance for a player based at least in part on the gaming media, as a result of the player having bet gaming media, to execute a game in a normal round, in a first-type free round, or in a second-type free round, thereby determining an arrangement of the symbols to be displayed on the display device based on the plurality of tables, and to pay out a win prize based on a bet amount betted by the player and a result of the execution of the game according to the plurality of tables, wherein the normal round is executed with a first symbol set including a plurality of symbols, the first-type free round is executed with a second symbol set that includes at least one first symbol in addition to the symbols in the first symbol set, the second-type free round is executed with a third symbol set that includes at least one second symbol in addition to the symbols in the first symbol set, the at least one second symbol being different from the at least one first symbol, a first number of the first-type free rounds are successively executed when a first condition is satisfied in the normal round, and a second number of the second-type free rounds are successively executed after the execution of the first number of the first-type free rounds are finished when a second condition is satisfied in the first-type free rounds.

2. The gaming machine of claim 1, wherein each of the at least one first symbol includes a wild symbol that is configured to substitute for other symbols, and each of the at least one second symbol includes a top symbol providing a higher probability of forming a winning combination than other symbols.

3. The gaming machine of claim 2, wherein a minimum number of the top symbols required to form a winning combination is smaller than a minimum number of other symbols required to form a winning combination.

4. The gaming machine of claim 3, wherein each of the first to third symbol sets includes a plurality of symbol strips including a first symbol strip, each arrangement of the symbols includes a predetermined number of symbols selected from each of the plurality of symbol strips, and a winning combination in an arrangement of the symbols includes either at least two of the top symbols or at least three of the same symbols except for the top symbols successively arranged on a payline starting from a first symbol strip.

5. The gaming machine of claim 3, wherein each of the first to third symbol sets includes a plurality of symbol strips including a first symbol strip, each arrangement of the symbols includes a predetermined number of symbols selected from each of the plurality of symbol strips, the at least one first symbol is disposed on the symbol strips other than the first symbol strip from which a payline starts, and the at least one second symbol is disposed on the first symbol strip.

6. The gaming machine of claim 5, wherein the at least one first symbol in the second symbol set are included in different symbol strips.

7. The gaming machine of claim 6, wherein the plurality of symbol strips include first to fifth symbol strips, a number of the at least one first symbols is four, and a number of the at least one second symbols is four.

8. The gaming machine of claim 7, wherein the first symbol set includes a plurality of third symbols, and the first condition is that an arrangement of the symbols determined in the normal round includes a third number of the third symbols.

9. The gaming machine of claim 8, wherein the second condition is that an arrangement of the symbols determined in the first-type free rounds includes the third number of the third symbols.

10. The gaming machine of claim 9, wherein the first condition is that each of the first to third symbol strips in an arrangement of the symbols determined in the normal round includes one of the third symbols, and the second condition is that each of the first to third symbol strips in an arrangement of the symbols determined in the first-type free rounds includes one of the third symbols.

11. The gaming machine of claim 10, wherein the third symbols are scatter symbols that are configured to form a scatter win.

12. The gaming machine of claim 11, wherein the first number is greater than the second number.

* * * * *